US011533350B2

(12) United States Patent
Ouedraogo et al.

(10) Patent No.: US 11,533,350 B2
(45) Date of Patent: *Dec. 20, 2022

(54) METHOD AND APPARATUS FOR ENCODING AND TRANSMITTING AT LEAST A SPATIAL PART OF A VIDEO SEQUENCE

(71) Applicant: CANON KABUSHIKI KAISHA, Tokyo (JP)

(72) Inventors: Naël Ouedraogo, Maure de Bretagne (FR); Jonathan Taquet, Talensac (FR); Franck Denoual, Saint Domineuc (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/996,656

(22) Filed: Aug. 18, 2020

(65) Prior Publication Data

US 2020/0382574 A1 Dec. 3, 2020

Related U.S. Application Data

(63) Continuation of application No. 15/923,584, filed on Mar. 16, 2018, now Pat. No. 10,785,276.

(30) Foreign Application Priority Data

Mar. 20, 2017 (GB) ..................................... 1704423

(51) Int. Cl.
*H04N 19/00* (2014.01)
*H04L 65/00* (2022.01)
(Continued)

(52) U.S. Cl.
CPC ............ *H04L 65/70* (2022.05); *H04L 65/612* (2022.05); *H04L 65/762* (2022.05);
(Continued)

(58) Field of Classification Search
CPC . H04L 65/607; H04L 65/4084; H04L 65/602; H04N 19/44; H04N 19/593;
(Continued)

(56) References Cited

U.S. PATENT DOCUMENTS

2010/0284460 A1* 11/2010 Tsai ....................... H04N 19/61
375/240.12
2013/0279564 A1* 10/2013 Wang ..................... H04N 19/70
375/240.02
(Continued)

FOREIGN PATENT DOCUMENTS

EP 1796398 A1 6/2007

*Primary Examiner* — Zhihan Zhou
(74) *Attorney, Agent, or Firm* — Canon U.S.A., Inc. IP Division

(57) ABSTRACT

When encoding and transmitting video data comprising regions of interest, different usages of the regions of interest implicate different kinds of combination of region of interest at decoding. By studying the different impacts of the encoding mechanisms depending on other set of tiles data on the different kind of combination, it is possible to define a plurality of tile set coding dependency levels. Each tile set coding dependency level is linked to a set of constraints on encoding. These set of constraints have different impacts on the possibilities allowed when combining the different regions of interest. It is therefore possible, based on a desired usage, to select an encoding with minimal restrictions, as defined by a given tile coding dependency level, compatible with the desired usage. Accordingly, the encoding efficiency is improved, for a given usage, compared to a solution where a complete tile independency solution is used.

24 Claims, 19 Drawing Sheets

(51) Int. Cl.
  *H04L 65/70* (2022.01)
  *H04N 19/44* (2014.01)
  *H04N 19/593* (2014.01)
  *H04N 19/70* (2014.01)
  *H04N 19/55* (2014.01)
  *H04N 19/17* (2014.01)
  *H04N 19/103* (2014.01)
  *H04L 65/612* (2022.01)
  *H04L 65/75* (2022.01)

(52) U.S. Cl.
  CPC ........... *H04N 19/103* (2014.11); *H04N 19/17* (2014.11); *H04N 19/44* (2014.11); *H04N 19/55* (2014.11); *H04N 19/593* (2014.11); *H04N 19/70* (2014.11)

(58) Field of Classification Search
  CPC ...... H04N 19/55; H04N 19/70; H04N 19/103; H04N 19/17
  See application file for complete search history.

(56) References Cited

U.S. PATENT DOCUMENTS

| | | | |
|---|---|---|---|
| 2014/0086333 A1* | 3/2014 | Wang | H04N 21/8451 375/240.25 |
| 2015/0261884 A1* | 9/2015 | Pang | G06F 16/9024 707/741 |
| 2015/0271529 A1* | 9/2015 | Wang | H04N 19/88 375/240.26 |
| 2016/0014480 A1* | 1/2016 | Maze | H04N 21/8451 725/116 |
| 2016/0156917 A1* | 6/2016 | Ugur | H04N 19/33 375/240.08 |
| 2016/0156928 A1* | 6/2016 | Hirabayashi | H04N 19/174 375/240.21 |
| 2016/0165248 A1* | 6/2016 | Lainema | H04N 19/107 375/240.08 |
| 2018/0242028 A1* | 8/2018 | Van Brandenburg | H04N 21/26258 |

* cited by examiner

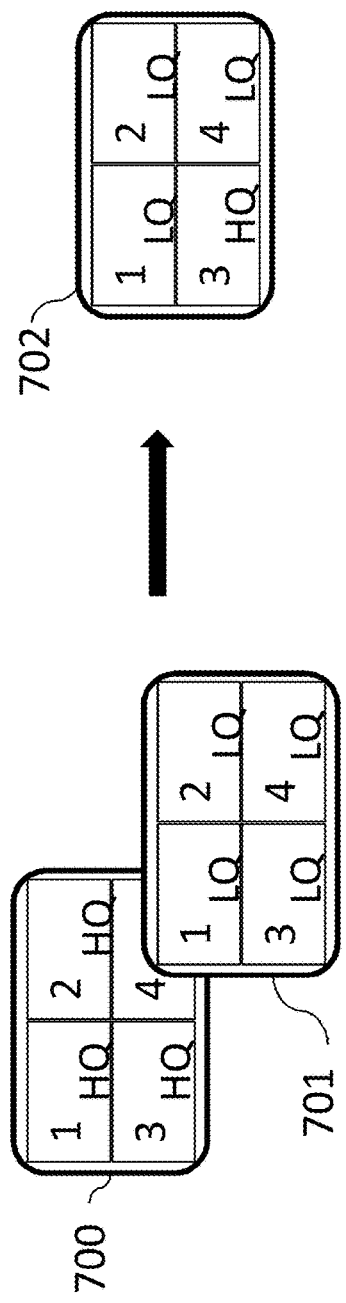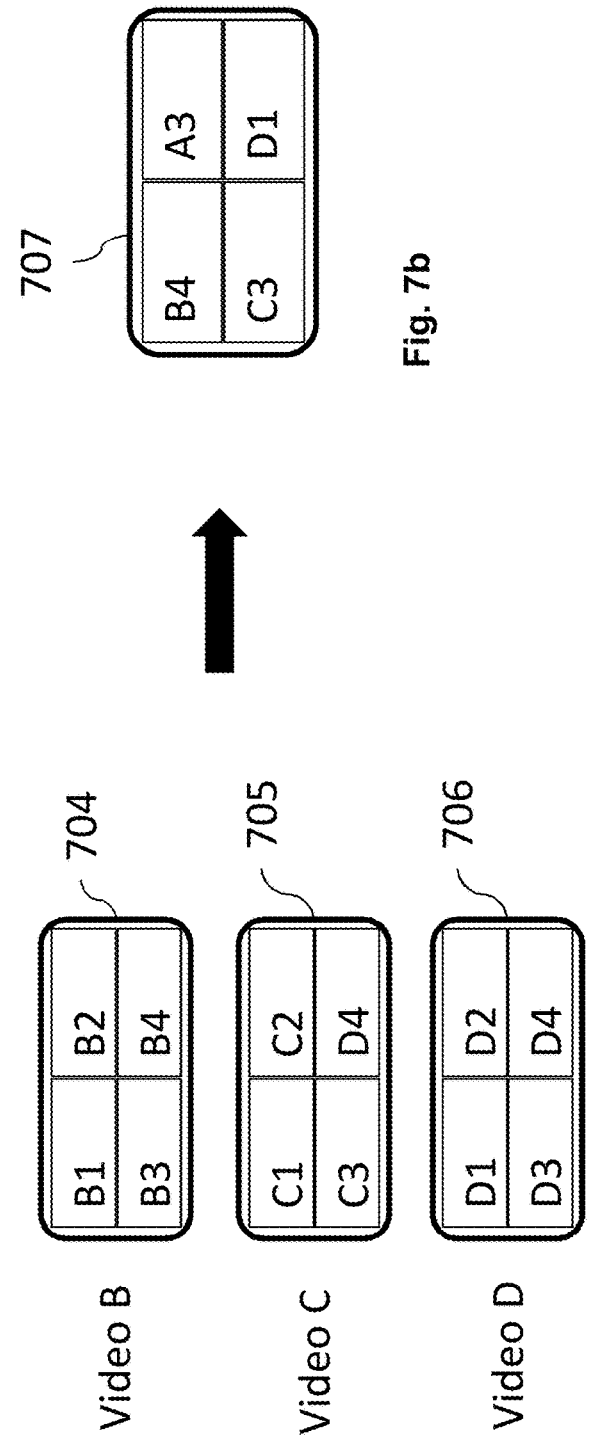
Fig. 7a
Fig. 7b

| | Descriptor |
|---|---|
| temporal_motion_constrained_tile_sets( payloadSize ) { | |
|   mc_all_tiles_exact_sample_value_match_flag | u(1) |
|   mc_all_tiles_exact_tcdl_value_match_flag | u(1) |
|   if( mc_all_tiles_exact_tcdl_value_match_flag) | |
|     mc_all_tiles_temporal_coding_dependency_value_match_idc | u(4) |
|   each_tile_one_tile_set_flag | u(1) |
|   if( !each_tile_one_tile_set_flag ) { | |
|     limited_tile_set_display_flag | u(1) |
|     num_sets_in_message_minus1 | ue(v) |
|     for( i = 0; i <= num_sets_in_message_minus1; i++ ) { | |
|       mcts_id[ i ] | ue(v) |
|       if( limited_tile_set_display_flag ) | |
|         display_tile_set_flag[ i ] | u(1) |
|       num_tile_rects_in_set_minus1[ i ] | ue(v) |
|       for( j = 0; j <= num_tile_rects_in_set_minus1[ i ]; j++ ) { | |
|         top_left_tile_index[ i ][ j ] | ue(v) |
|         bottom_right_tile_index[ i ][ j ] | ue(v) |
|       } | |
|       if( !mc_all_tiles_exact_sample_value_match_flag ) | |
|         mc_exact_sample_value_match_flag[ i ] | u(1) |
|       mcts_tier_level_idc_present_flag[ i ] | u(1) |
|       if( !mc_all_tiles_exact_tcdl_value_match_flag ) | |
|         mc_temporal_coding_dependency_value_idc | u(4) |
|       if( mcts_tier_level_idc_present_flag[ i ] ) { | |
|         mcts_tier_flag[ i ] | u(1) |
|         mcts_level_idc[ i ] | u(8) |
|       } | |
|     } | |
|   } else { | |
|     max_mcs_tier_level_idc_present_flag | u(1) |
|     if( mcts_max_tier_level_idc_present_flag ) { | |
|       mcts_max_tier_flag | u(1) |
|       mcts_max_level_idc | u(8) |
|     } | |
|   } | |
| } | |

Fig. 8

```
class TileRegionGroupEntry() extends VisualSampleGroupEntry('trif')
{
    unsigned int(16) groupID;
    unsigned int(1) tile_region_flag;
    if (!tile_region_flag)
        bit(7) reserved = 0;
    else {
        unsigned int(2) independent_idc;
        unsigned int(1) full_picture;
        unsigned int(1) filtering_disabled;
        unsigned int(1) has_dependency_list;
        bit(2) reserved = 0;
        if (!full_picture) {
            unsigned int(16) horizontal_offset;
            unsigned int(16) vertical_offset;
        }
        unsigned int(16) region_width;
        unsigned int(16) region_height;
        unsigned int(8) codingDependencyLevel;
        if (has_dependency_list) {
            unsigned int(16) dependency_tile_count;
            for (i=1; i<= dependency_tile_count; i++)
                unsigned int(16) dependencyTileGroupID;
        }
    }
}
```

Fig. 9a

```
class TileRegionGroupEntry() extends VisualSampleGroupEntry('trif')
{
    unsigned int(16) groupID;
    unsigned int(1) tile_region_flag;
    if (!tile_region_flag)
        bit(7) reserved = 0;
    else {
        unsigned int(2) independent_idc;
        unsigned int(1) full_picture;
        unsigned int(1) filtering_disabled;
        unsigned int(1) has_dependency_list;
        unsigned int(1) composable;
        unsigned int(1) reserved;
        if (!full_picture) {
            unsigned int(16) horizontal_offset;
            unsigned int(16) vertical_offset;
        }
        unsigned int(16) region_width;
        unsigned int(16) region_height;
        if (has_dependency_list) {
            unsigned int(16) dependency_tile_count;
            for (i=1; i<= dependency_tile_count; i++)
                unsigned int(16) dependencyTileGroupID;
        }
    }
}
```

Fig. 9b

| EssentialProperty@value or SupplementalProperty@value parameter | Use | Description |
|---|---|---|
| source_id | M | non-negative integer in decimal representation providing the identifier for the source of the content |
| object_x | M | non-negative integer in decimal representation expressing the horizontal position of the top-left corner of the Spatial Object in arbitrary units |
| object_y | M | non-negative integer in decimal representation expressing the vertical position of the top-left corner of the Spatial Object in arbitrary units |
| object_width | M | non-negative integer in decimal representation expressing the width of the Spatial Object in arbitrary units |
| object_height | M | non-negative integer in decimal representation expressing the height of the Spatial Object in arbitrary units |
| total_width | O | optional non-negative integer in decimal representation expressing the width of the reference space in arbitrary units. [...] |
| total_height | O | optional non-negative integer in decimal representation expressing the height of the reference space in arbitrary units. [...] |
| spatial_set_id | O | optional non-negative integer in decimal representation providing an identifier for a group of Spatial Object. [...] |
| tile_coding_dependency_level | O | optional non-negative integer in decimal representation providing the coding dependency level to the region<br><br>When equal to 0 indicates that the region can be decoded correctly when combined with other region with different source_id and its decoded location can be changed<br><br>When equal to 1 indicates that the region can be decoded correctly when combined with other region with different source_id while preserving its decoded location<br><br>When equal to 2 indicates that the region can be decoded correctly solely or when combined with region with same source_id<br><br>When equal to 3 indicates that the region can be decoded solely or when combined with region with same source_id with potentially decoding artefacts on the Spatial Object boundary |

Legend:

M=Mandatory, O=Optional

Fig. 10

| | Descriptor |
|---|---|
| tileset_decoded_picture_hash( payloadSize ) { | |
|   tile_hash_count | ue(v) |
|   for( k= 0; k < tile_hash_count; k++ ) | |
|     num_tile_rects_in_set_minus1[k] | ue(v) |
|     for( j = 0; j <= num_tile_rects_in_set_minus1[ k ]; j++ ) { | |
|       top_left_tile_index[ k ][ j ] | ue(v) |
|       bottom_right_tile_index[ k ][ j ] | ue(v) |
|     } | |
|     hash_type[k] | u(8) |
|     for( cIdx = 0; cIdx < ( chroma_format_idc == 0 ? 1 : 3 ); cIdx++ ) | |
|       if( hash_type[k] == 0 ) | |
|         for( i = 0; i < 16; i++) | |
|           picture_md5[k][ cIdx ][ i ] | b(8) |
|       else if( hash_type[k] == 1 ) | |
|         picture_crc[k][ cIdx ] | u(16) |
|       else if( hash_type[k] == 2 ) | |
|         picture_checksum[k][ cIdx ] | u(32) |
| } | |

Fig. 11

| | Descriptor |
|---|---|
| mcts_context_info( payloadSize ) { | |
|   num_sets_in_message_minus1 | ue(v) |
|   for( i = 0; i <= num_sets_in_message_minus1; i++ ) { | |
|     tile_set_id[i] | ue(v) |
|     top_left_tile_index[i] | ue(v) |
|     bottom_right_tile_index[i] | ue(v) |
|     One_or_more_slice_flag[i] | u(1) |
|     tile_set_prediction_dependency[i] | u(4) |
|   } | |

Fig. 13

| | Descriptor |
|---|---|
| mcts_context_info( payloadSize ) { | |
|   num_mcts_context_in_minus1 | ue(v) |
|   for( i = 0; i <= num_mcts_context_minus1; i++ ) { | |
|     mcts_context_id[ i ] | ue ( v ) |
|     mcts_slice_encapsulated_flag[i] | u(1) |
|     mcts_motion_vectors_over_pic_boundaries[i] | u(1) |
|     if ( loop_filter_across_tiles_enabled_flag ) { | |
|       mcts_exclude_loop_filter_margin[i] | u(1) |
|     } | |
|     mcts_temporal_motion_vector_predictor_flag[i] | u(1) |
|   } | |
| } | |

Fig. 14

```
class TileRegionGroupEntry() extends VisualSampleGroupEntry ('trif')
{
    unsigned int(16) groupID;
    unsigned int(1) tile_region_flag;
    if (!tile_region_flag)
        bit(7) reserved = 0;
    else {
        unsigned int(2) independent_idc;
        unsigned int(1) full_picture;
        unsigned int(1) filtering_disabled;
        unsigned int(1) has_dependency_list;
        bit(2) reserved = 0;
        if (!full_picture) {
            unsigned int(16) horizontal_offset;
            unsigned int(16) vertical_offset;
        }
        unsigned int(16) region_width;
        unsigned int(16) region_height;
        if (has_dependency_list) {
            unsigned int(16) dependency_tile_count;
            if (dependency_tile_count > 0) {
                for (i=1; i<= dependency_tile_count; i++)
                    unsigned int(16) dependencyTileGroupID;
            }
        } else {
            unsigned int (8) decodable_elsewhere;
        }
    }
}
```

Fig. 15

| | Descriptor |
|---|---|
| mcts_context_info( payloadSize ) { | |
|   num_sets_in_message_minus1 | ue(v) |
|   for( i = 0; i <= num_sets_in_message_minus1; i++ ) { | |
|     tile_set_id[ i ] | ue(v) |
|     top_left_tile_index[ i ] | ue(v) |
|     bottom_right_tile_index[ i ] | ue(v) |
|     One_or_more_slice_flag [ i ] | u(1) |
|     tile_set_prediction_dependency[ i ] | u(4) |
|     hash_type | u(8) |
|     for( cIdx = 0; cIdx < ( chroma_format_idc == 0 ? 1 : 3 ); cIdx++ ) | |
|       if( hash_type == 0 ) | |
|         for( i = 0; i < 16; i++ ) | |
|           tile_set_md5[ cIdx ][ i ] | b(8) |
|       else if( hash_type == 1 ) | |
|         tile_set_crc[ cIdx ] | u(16) |
|       else if( hash_type == 2 ) | |
|         tile_set_checksum[ cIdx ] | u(32) |
| } | |

Fig. 16

| | Descriptor |
|---|---|
| decoded_mcts_hash( payloadSize ) { | |
|   num_mcts_hash_minus1 | ue(v) |
|   for( n = 0; n <= num_mcts_hash_minus1; n++) { | |
|     mcts_hash_id[ n ] | ue(v) |
|     mcts_hash_rect_idx[ n ] | ue(v) |
|     crop_mcts_hash[ n ] | u(1) |
|     if( crop_mcts_hash[ n ] ) { | |
|       crop_mcts_hash_with_same_margins[ n ] | u(1) |
|       if( crop_mcts_hash_with_same_margins[ n ] ) | |
|         crop_mcts_hash_margin[ n ] | ue(v) |
|       else { | |
|         crop_mcts_hash_top_margin[ n ] | ue(v) |
|         crop_mcts_hash_bottom_margin[ n ] | ue(v) |
|         crop_mcts_hash_left_margin[ n ] | ue(v) |
|         crop_mcts_hash_right_margin[ n ] | ue(v) |
|       } | |
|     } | |
|     mcts_hash_type[ n ] | u(8) |
|     for( cIdx = 0; cIdx < ( chroma_format_idc == 0 ? 1 : 3 ); cIdx++ ) { | |
|       if( mcts_hash_type == 0 ) | |
|         for( i = 0; i < 16; i++) | |
|           mcts_md5[ n ][ cIdx ][ i ] | b(8) |
|       else if( mcts_hash_type == 1 ) | |
|         mcts_crc[ n ][ cIdx ] | u(16) |
|       else if( mcts_hash_type == 2 ) | |
|         mcts_checksum[ n ][ cIdx ] | u(32) |
|     } | |
|   } | |
| } | |

Fig. 18

| | Descriptor |
|---|---|
| temporal_motion_constrained_tile_sets( payloadSize ) { | |
|   mc_all_tiles_exact_sample_value_match_flag | u(1) |
|   each_tile_one_tile_set_flag | u(1) |
|   if( !each_tile_one_tile_set_flag ) { | |
|     limited_tile_set_display_flag | u(1) |
|     num_sets_in_message_minus1 | ue(v) |
|     for( i = 0; i <= num_sets_in_message_minus1; i++ ) { | |
|       mcts_id[ i ] | ue(v) |
|       if( limited_tile_set_display_flag ) | |
|         display_tile_set_flag[ i ] | u(1) |
|       num_tile_rects_in_set_minus1[ i ] | ue(v) |
|       for( j = 0; j <= num_tile_rects_in_set_minus1[ i ]; j++ ) { | |
|         top_left_tile_index[ i ][ j ] | ue(v) |
|         bottom_right_tile_index[ i ][ j ] | ue(v) |
|       } | |
|       if( !mc_all_tiles_exact_sample_value_match_flag ) | |
|         mc_exact_sample_value_match_flag[ i ] | u(1) |
|       mcts_tier_level_idc_present_flag[ i ] | u(1) |
|       if( mcts_tier_level_idc_present_flag[ i ] ) { | |
|         mcts_tier_flag[ i ] | u(1) |
|         mcts_level_idc[ i ] | u(8) |
|       } | |
|       tile_set_digest_flag | u(1) |
|       if( tile_set_digest_flag ) { | |
|         decoded_mcts_hash() | |
|       } | |
|     } | |
|   } else { | |
|     max_mcs_tier_level_idc_present_flag | u(1) |
|     if( mcts_max_tier_level_idc_present_flag ) { | |
|       mcts_max_tier_flag | u(1) |
|       mcts_max_level_idc | u(8) |
|     } | |
|   } | |
| } | |

Fig. 19

METHOD AND APPARATUS FOR ENCODING AND TRANSMITTING AT LEAST A SPATIAL PART OF A VIDEO SEQUENCE

CROSS-REFERENCE TO RELATED APPLICATIONS

This application is a continuation of U.S. patent application Ser. No. 15/923,584, filed on Mar. 16, 2018. This application claims the benefit under 35 U.S.C. § 119(a)-(d) of United Kingdom Patent Application No. 1704423.1, filed on Mar. 20, 2017 and entitled "METHOD AND APPARATUS FOR ENCODING AND TRANSMITTING AT LEAST A SPATIAL PART OF A VIDEO SEQUENCE". The above-cited patent applications are incorporated herein by reference in their entirety.

TECHNICAL FIELD OF THE INVENTION

The present disclosure concerns a method and a device for encoding or decoding video content. It concerns more particularly the encoding of different region of interest in videos in order to allow recomposing a video from different regions of interest. The encoding and decoding is contemplated in the context of Dynamic Adaptive Streaming over HTTP (DASH) of video content encoded according to H265/HEVC. High Efficiency Video Coding (HEVC), also known as H.265 and MPEG-H Part 2, is a video compression standard.

BACKGROUND OF THE INVENTION

Video content is composed of successive images, also named frames. When encoding a video, each frame is decomposed into encoding elementary blocks of pixels named coding units (CU). The main encoding mechanism used to encode a coding unit is predictive encoding. Predictive encoding consists in determining the location in the previously encoded data of a coding unit that is very close to the coding unit to encode, this coding unit is called the predictor block. The result of the encoding of the coding unit is typically information to identify the location of the predictor block and the compression of the difference between the predictor block and the coding unit, this difference being called the residual. Different encoding modes have been defined and are available to encode any given coding unit. Typically the best one is chosen for each encoding unit, the best being defined by the size in term of bitrate of the encoded result. Coding modes differ typically by the location allowed for the block predictor and/or the way to identify this location. For example, spatial encoding modes, named INTRA modes, are coding modes where the predictor blocks and the coding unit to be encoded are localized within the same frame. Temporal encoding modes, named INTER modes, are encoding modes where the predictor blocks and the coding unit to be encoded are localized in different frames of the video content. Among the different ways used to indicate the location of the predictor block, one of the most popular is the motion vector. A motion vector is a vector giving the relative location of the predictor block regarding the coding unit to be encoded. In some encoding modes, motion vector themselves may be subject to predictive encoding using a motion vector predictor, an indication to locate this motion vector predictor and the compression of a residual motion vector defined by the difference between the motion vector predictor and the actual motion vector to be used.

A Region Of Interest (ROI) in video content is an area in the video frames that is of particular interest. The typical usage of the concept of region of interest is, at decoding, during the rendering of the video content to be able to highlight this region of interest, or even to restrict the rendering to this particular area. Advantageously, a selected region of interest might be encoded and transmitted independently to allow independent decoding and rendering. By doing so, the burden of encoding transmitting and decoding the whole video content may be saved, when only a part of it is needed at the decoder.

Mechanisms have been provided to support the encoding of region of interest. The main mechanism is called the tile. HEVC provides means to define spatial division of frames called tiles. HEVC tiles have been introduced to allow parallel encoding and decoding of each frame. In order to allow independent encoding, transmission and decoding of tiles, HEVC provides a mechanism to guarantee this independence. This independence is not mandatory and the standard provides signalisation to indicate if a given video content using tile encoding allows for independent decoding of tiles or not.

In order to provide independent encoding and decoding of tiles, it is mandatory that the encoding, and therefore the decoding, of a given tile does not depend on data outside the tile. Regarding predictive encoding, it means that block predictors, either spatial or temporal, or motion vector predictors, must be restrained to be located within the tile. Other encoding mechanisms implicate a dependency on other tile data as well. For example, HEVC provides a mechanism called deblocking filtering. This mechanism consists in applying after decoding of the coding units of the frame a filtering step in order to limit any block artefact that might be introduced by the encoding/decoding process. The filtered result value of a given pixel depends on the value of its neighbours. Obviously, at the boundary of a tile, the filtered result value of a pixel depends on the value of neighbour pixels pertaining to other tiles. These mechanisms have to be disabled as well to guarantee independent decoding of tiles.

Obviously, independent encoding of tiles has an impact on the efficiency of the encoding process by restraining the encoding option to ensure that the encoding of a given tile depends only on data pertaining to this tile.

The number of usages of region of interest is increasing. For example, it is contemplated to generate so called mosaic videos generated by the combination of multiple region of interest pertaining to one or even several video sequences. It would be advantageous to improve the efficiency of the encoding of video sequences containing some regions of interest in the context of an increasing number of usages of these regions of interest.

BRIEF SUMMARY OF THE INVENTION

The present invention has been devised to address one or more of the foregoing concerns. In the context of the invention, a region of interest is defined by a set of tiles. The inventors have considered that different usages of the regions of interest implicate different kinds of combinations of regions of interest at decoding. By studying the different impacts of the encoding mechanisms depending on other set of tiles data on the different kinds of combinations, it is possible to define a plurality of Tile Coding Dependency Levels (TCDL). Each tile coding dependency level is linked to a set of constraints on encoding. These set of constraints have different impacts on the possibilities allowed when combining the different regions of interest. It is therefore possible, based on a desired usage, to select an encoding with minimal restrictions, as defined by a given tile coding dependency level, compatible with the desired usage. Accordingly, the encoding efficiency is improved, for a given usage, compared to a solution where a complete tile independency solution is used.

According to a first aspect of the invention there is provided a method for encoding data corresponding to at least one spatial part of a video sequence, each of a plurality of frames of the video sequence being divided into spatial tiles, a spatial part of the video sequence corresponding to a set of tiles, the method comprising by a server device:

- determining additional data, for signaling at least one tile set coding dependency level associated to the set of tiles forming the at least one spatial part of the video sequence;
- each tile set coding dependency level being associated to encoding constraints used for encoding the set of tiles forming the at least one spatial part of the video sequence;
- each tile set coding dependency level being related to the decoding context of the set of tiles when decoded at a decoding unit; and
- encoding the at least one spatial part of the video sequence according to the encoding constraints associated to the tile set coding dependency level.

In an embodiment, each tile set coding dependency level indicates a set of prediction constraints, which are disabled.

In an embodiment, one tile set coding dependency level is related to the possibility to combine any spatial parts from different video sequences at any location in the decoded frame.

In an embodiment, one tile set coding dependency level is related to the possibility to combine any spatial parts from different video sequences with the additional constraint that a tile set sharing a border with the frame at encoding must be decoded at a location sharing the same border with the frame.

In an embodiment, one tile set coding dependency level is related to the possibility to partially decode any spatial parts from a video sequence.

In an embodiment, one tile set coding dependency level is related to the possibility to partially decode any spatial parts from a video sequence with cropping of a band of pixels on the spatial parts interior boundaries.

In an embodiment, the tile set coding dependency level is defined by a set of at least one parameters, each parameter corresponding to a set of at least one encoding constraints.

In an embodiment, the tile set coding dependency level is signalled in the encoded video data.

In an embodiment, the tile set coding dependency level is signalled in the encapsulation part of the encapsulated video data.

In an embodiment, the method further comprises:
applying a hash function to each tile set; and
signalling the result of the hash function for each tile set in the encoded video data.

According to another aspect of the invention there is provided a method for transmitting data corresponding to a video sequence, by a server device to a client device, the method comprising:

- receiving from the client device at least one request message for requesting at least a spatial part of the video sequence, each of a plurality of frames of the video sequence being divided into spatial tiles, the spatial part of the video sequence corresponding to a set of tiles; and
- encoding the requested spatial parts of the video sequence according to the invention;
- encapsulating and transmitting to the client device video data corresponding to the requested at least one spatial part of the video sequence.

In an embodiment, the tile set coding dependency level is signalled in a description file describing alternative representations of the video data available on the server device, the description file being transmitted to the client device.

According to another aspect of the invention there is provided a method for receiving data corresponding to a video sequence, by a client device from a server device, the method comprising:

- transmitting to the server device at least one request message for requesting at least a spatial part of the video sequence, each of a plurality of frames of the video sequence being divided into spatial tiles, the spatial part of the video sequence corresponding to a set of tiles; and
- receiving from the server device video data corresponding to the requested at least one spatial part of the video sequence;
- wherein the method further comprises
- receiving additional data from the server device, for signaling at least one tile set coding dependency level associated to the set of tiles forming the requested spatial part of the video sequence;
- each tile set coding dependency level being associated to encoding constraints used for encoding the set of tiles forming the requested spatial part of the video sequence;
- each tile set coding dependency level being related to the decoding context of the set of tiles when decoded at a decoding unit.

According to another aspect of the invention there is provided a server device for encoding data corresponding to at least one spatial part of a video sequence, each of a plurality of frames of the video sequence being divided into spatial tiles, a spatial part of the video sequence corresponding to a set of tiles, the server device comprising:

- means for determining additional data, for signaling at least one tile set coding dependency level associated to the set of tiles forming the at least one spatial part of the video sequence;
- each tile set coding dependency level being associated to encoding constraints used for encoding the set of tiles forming the at least one spatial part of the video sequence;
- each tile set coding dependency level being related to the decoding context of the set of tiles when decoded at a decoding unit; and
- an encoder for encoding the at least one spatial part of the video sequence according to the encoding constraints associated to the tile set coding dependency level.

In an embodiment, the server further comprises:
a receiver for receiving from the client device at least one request message for requesting the least a spatial part of the video sequence; and
a transmitter for transmitting to the client device video data corresponding to the requested at least one spatial part of the video sequence.

According to another aspect of the invention there is provided a client device for receiving data corresponding to a video sequence, from a server device, the client device comprising:

a transmitter for transmitting to the server device at least one request message for requesting at least a spatial part of the video sequence, each of a plurality of frames of the video sequence being divided into spatial tiles, the spatial part of the video sequence corresponding to a set of tiles; and a receiver for receiving from the server device video data corresponding to the requested at least one spatial part of the video sequence;

wherein the client device further comprises:

means for receiving additional data from the server device, for signaling at least one tile set coding dependency level associated to the set of tiles forming the requested spatial part of the video sequence;

each tile set coding dependency level being associated to encoding constraints used for encoding the set of tiles forming the requested spatial part of the video sequence;

each tile set coding dependency level being related to the decoding context of the set of tiles when decoded at a decoding unit.

According to another aspect of the invention there is provided a computer program product for a programmable apparatus, the computer program product comprising a sequence of instructions for implementing a method according to the invention, when loaded into and executed by the programmable apparatus.

According to another aspect of the invention there is provided a computer-readable storage medium storing instructions of a computer program for implementing a method according to the invention.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE SEVERAL VIEWS OF THE DRAWINGS

Embodiments of the invention will now be described, by way of example only, and with reference to the following drawings in which:

FIGS. 7a and 7b illustrate two different usage scenarios examples for the combination of regions of interest;

FIGS. 8, 9a, 9b and 10 illustrate different examples of tile set coding dependency levels signaling information;

FIG. 11 illustrates the introduction of a control code at the tile set level in an embodiment of the invention;

FIG. 13 illustrates an example of SEI message in an embodiment of the invention;

FIG. 14 illustrates another example of SEI message in an embodiment of the invention;

FIG. 15 illustrates an example of TileRegionGroupEntry( ) parameter in an embodiment of the invention;

FIG. 16 illustrates another example of SEI message in an embodiment of the invention;

FIG. 18 illustrates another example of SEI message in an embodiment of the invention;

FIG. 19 illustrates another example of SEI message in an embodiment of the invention.

DETAILED DESCRIPTION OF THE INVENTION

The proposed invention makes it possible to generate an improved video stream, in terms of bitrate, depending on the combination usage of the region of interest, or sub-parts, in video streams. The coding dependencies between set of tiles of the video stream are adapted to the kind of combination needed for a contemplated usage. For instance, when the desired usage of the video stream is to decode only a subset of the regions of interest of one video stream, meaning that no combination with other video streams is needed, the dependencies breaking mechanisms are relaxed and some coding dependencies between the tiles of the subset are authorized. In a second example, when the regions of interest are combined with other regions of interest, especially from same or/and other video streams, to form a new video stream, meaning that each region of interest may be located at a total different position that its original one, the inventors have noticed that coding dependencies should rather be reduced to avoid any decoding artefacts. A coding dependency level between the regions of interest is thus defined in function of the usage scenario of the video stream.

The coding dependency level may be specified at Elementary Stream or at System level to enable a decoder to determine how the regions of interest of the video stream can be combined with other video streams. In addition, for streaming applications, the coding dependency level may be specified in a manifest file describing alternative representations of the video streams. One example of streaming protocol and manifest is MPEG DASH or Apple HTTP Live Streaming or Microsoft Smooth Streaming. For example, a DASH client can rely on this coding dependency level to select the appropriate representation of each region of interest according to its targeted usage scenario.

Advantageously, the invention makes it possible for the client to select appropriate representation in function of its combination requirements with other video streams. It optimizes the bitrate in function of the usage scenario; indeed the more dependencies are kept, the more efficient is the compression.

Figure 1:
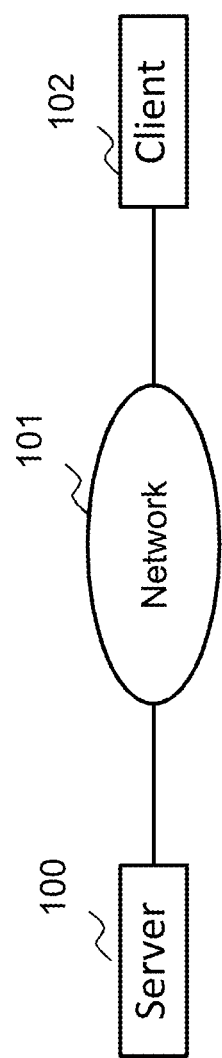
FIG. 1 illustrates the system considered in an embodiment of the invention.

FIG. 1 illustrates the system considered in an embodiment of the invention.

This invention relates to interactive streaming of mosaic video streams between a server or a proxy server 100 and a client 102. The server 100 includes a block based encoder typically according to the HEVC standard, or one of its extension, that compresses a set of video sequences while providing spatial random access to some areas of the frames, the regions of interest. Each frame of the HEVC encoded video sequence is partitioned in different sub parts, called tiles. The server processing is detailed in the description relative to FIG. 5.

The server 100 receives through the communication network 101, a request for a description of the available video streams for interactive streaming. The communication network 101 is based on Internet Protocol (IP) standard. The standard protocol employed to transmit the media presentation over the IP network 101 is preferably MPEG DASH: Dynamic Adaptive Streaming over HTTP. However, the invention can also be used for other adaptive HTTP streaming protocols. HTTP refers to the Hyper Text Transfer Protocol as defined by the World Wide Web Consortium (W3C). The DASH standard enables to create an association between a compact description of each media content of the media presentation and HTTP addresses that may be used to request this media content. Usually, this association is described in a file called a manifest file. In the context of MPEG DASH, this manifest file is an XML file that is called the Media Presentation Description file (MPD). When the MPD is sent to the client 102, the description of each media content is made available to the client. By reading the manifest, the client is aware of the kind of media contents proposed in the media presentation and is aware of the HTTP addresses for downloading the associated media contents. Therefore, it can select which media content to download, using HTTP requests. The downloaded media contents are decoded and played after reception in a rendering step.

In addition to this association, the DASH standard proposes to split each media content into small periods of time, called media segments. The time decomposition is added and described in the MPD file. Common properties applying to a time interval can be defined, for example, in a <Period> element. The MPD file is therefore a file that describes the association between HTTP addresses and the compact description of each media content over a small period of time. With such a mean, the client downloads the desired media contents of the media presentation over the desired period of time.

In context of DASH, "File formats" are used to encapsulate and describe encoded bitstreams, in particular to provide timing information and properties on the samples, in case of video samples are frames. In particular, the ISO Base Media File Format (ISO BMFF) is well-known to provide flexible and extensible format to describe timed encoded media bitstreams either for 'local' storage or access via a network or other stream delivery mechanism. There exists other encapsulation like WebM or Matroska for example that could also benefit from the invention and be used for the streaming of videos encoded according to this invention.

An HEVC Bitstream is encapsulated using ISO Base Media File Format in such a way it allows accessing to ROI with HTTP requests, for example using the DASH SRD feature, for Spatial Relationship Description. This is detailed in relation to FIG. 10. The file format allows each sub part of the HEVC bitstream to be accessible by a HTTP request like the one depicted on FIG. 4. In this embodiment, the client selects a Region of Interest and creates the corresponding HTTP requests and sends them to the server. The server can extract the subparts of the encoded bitstream from the file format and send them to the client. The client can then decode the different sub-parts and then display the decoded pixels corresponding to the requested region of interest.

The whole client 102 process is detailed with reference to FIG. 6.

Figure 2:
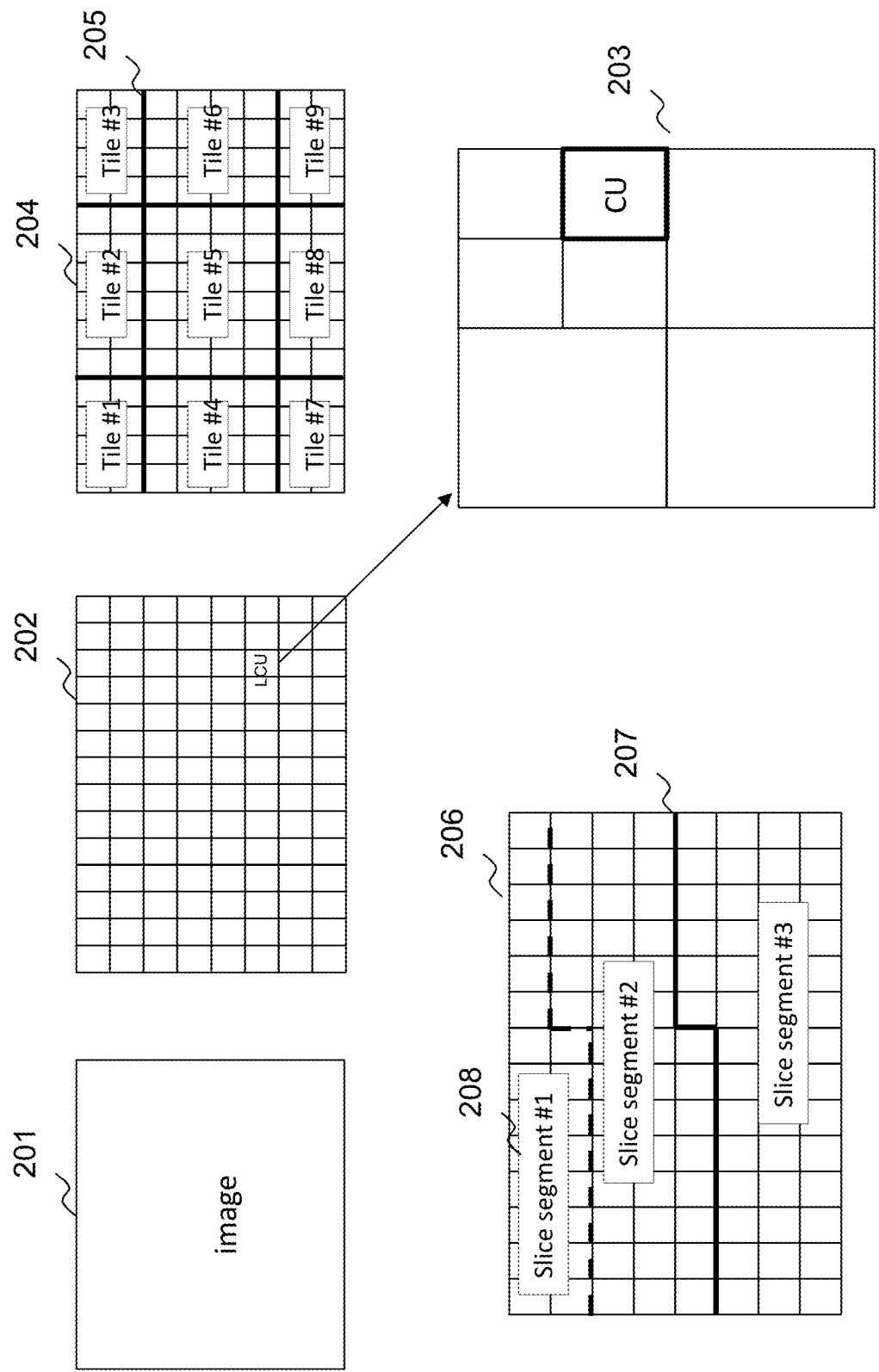
FIG. 2 illustrates HEVC image partitioning.

FIG. 2 illustrates HEVC image partitioning.

According to HEVC, the original video sequence is a succession of digital images or frames. As is known per se, a digital image is represented by one or more matrices, the coefficients of which represent pixels.

The image 201 is divided into non-overlapping Coding Tree Units (CTUs) 202, generally blocks of 64 pixels×64 pixels. Each CTU may itself be iteratively divided into smaller variable size Coding Units (CUs) 203, using quadtree decomposition. Coding units are the elementary coding elements and are constituted of two sub units which are: Prediction Unit (PU) and Transform Units (TU) of maximum size equal to the CU's size. Prediction Unit corresponds to the partition of the CU for prediction of pixels values, prediction being part of the encoding process. Each CU can be further partitioned into a maximum of two symmetric rectangular Partition Units or in asymmetric partitions. Transform units are used to represent the elementary units that are spatially transformed with DCT, transform being part of the encoding process. A CU can be partitioned in TU based on a quadtree representation. The CU is formed of three coding blocks each block corresponding to one of the YUV components. HEVC standard provides different types of image segmentation mechanisms: slice segments and tiles.

The image 201 is divided into slices composed of slice segments 208. A slice segment is a part of the image or the entire image. Each slice segment contains an integer number of Coding Tree Units (CTUs).

HEVC defines two kinds of slice segments, independent and dependent slice segments. Each slice segment is embedded in one NAL unit, which is a structure having a generic format for use in both packet-oriented and bitstream-oriented transport systems. A specific flag in the slice segment header permits to determine if the slice segment is independent or not. The difference between the two types of slice segments resides in the fact that data specified in the independent slice segment header defines all parameters necessary to decode encoded CUs of the slice segment. On the other hand, a dependent slice segment has a reduced header and relies on the first preceding independent slice segment to infer parameters not available in its header. The address of the first CTU in the slice is specified in the independent slice segment header.

A set of one independent slice segment and consecutive dependent slice segments (if any available) represents a slice in HEVC. Two neighboring coding units (CU) that belong to the same slice can be predicted with each other. On the contrary, if the CUs are not in the same slice all prediction mechanisms are broken by the slice boundary. Consequently, one coding unit can use data of another CU that is coded in another slice segment if the two slice segments belong to the same slice.

For instance, the frame 206 has been divided in three slice segments. The two first slice segments #1 and #2 form one slice and the last slice segment #3 forms another slice. Slice segment #1 and #3 are both independent slice segments while slice segment #2 is a dependent slice segment (depending on #1). Coding units of slice segments #3 are coded independently of any of the CUs in the slice segment #2 and #1 since separated by a slice boundary 207. To decode the data of dependent slice segment #2, some information of the independent slice segment #1 must be retrieved to infer the encoding parameter of the dependent slice segment #2. In addition, prediction of information from CUs of the slice segment #1 to better compress coding units of the slice segment #2 is enabled.

HEVC also provides tile partitioning which permits to split each frame in independently coded rectangular areas as depicted in the frame 204. Each tile contains an integer number of CTUs. Inside tiles, CTUs are scanned in raster scan order. Similarly to slice boundaries, tile boundaries break all intra prediction mechanisms. The word "intra" here is important, it means that only spatial coding dependencies are broken at the tiles boundaries. HEVC tiles have been introduced to allow parallel encoding and decoding of each frame.

In HEVC, tiles are defined in a Picture Parameter Set (PPS) included in specific NAL unit which is used to initialize the decoding process. PPS NAL unit includes syntax elements that specify the number of tile rows and the number of tile columns in the picture and their associated sizes. The tile locations, offset in bits, in one slice segment are identified with syntax elements available at the end of the slice segment header.

Tiles and slice segments may be jointly used but with some restrictions. One or both of the following sentences must be verified:

All CTUs of one slice (or slice segment) belong to the same tile or all CTUs of one tile belong to the same slice (or slice segment).

It means that one slice, or slice segment, may contain several entire tiles or be only a sub part of single tile. Second, a tile may contain several entire slices, or slice segments, or only be a sub part of a single slice, or slice segment.

Figure 3:
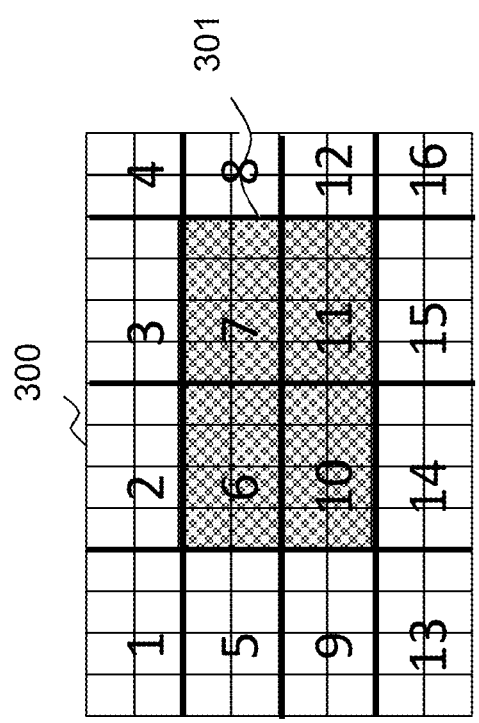
FIG. 3 illustrates typical HEVC partitioning for region of interest streaming.

FIG. 3 illustrates typical HEVC partitioning for region of interest streaming.

HEVC provides several partitioning methods to enable decoding of spatial random access points in the frame. In this document, regions of interest are considered as rectangular areas within a frame. Consequently, tiles or set of tiles are employed to allow spatial random access to sub parts of a frame, or encoded image.

In addition to allow streaming of only useful encoded data corresponding to one ROI, each tile or set of tiles should be embedded in separate NAL units.

This section presents how to partition an HEVC video sequence with HEVC partitioning tools to enable creation of regions of interest while ensuring that each region of interest data can be transmitted independently. Such partitioning strategy has an impact on the coding efficiency since the introduction of tile boundaries breaks some HEVC prediction mechanisms. Moreover, the partitioning of each tile in one slice, or one slice segment, introduces an overhead due to the addition of encoding parameters headers to enable independent decoding of each slices.

Classical known solution consists in embedding each tile in one slice, therefore one independent slice segment and 0 or more dependent slice segment. For instance, in the FIG. 3, the frame 300 is partitioned in a 4×4 tile grid. To access to the predefined ROI 301, the NAL units embedding the slice segments corresponding to tiles 6, 7, 10 and 11 are selected and transmitted to the client. In the following, the method according to one embodiment of the invention proposes to use this partitioning method for any region of interest in the frame. This method is distinct from other partitioning methods which may use more slices per tile. This method is advantageous to enable independent access to ROI.

Tiles break all intra prediction mechanisms (except loop filtering processing) at their boundaries, therefore all spatial prediction mechanisms. However, several prediction mechanisms rely on temporal redundancy of data between the frames of the video sequence to improve the compression efficiency. For instance, the temporal prediction consists in predicting a coding block in a given frame from a predictor block from another frame, called the reference frame. The predictor block in the reference frame is obtained thanks to a motion vector which indicates the position of the predictor block relatively to the current block coordinates. Temporal predicted blocks are thus coded through one motion vector and a residual block which represents the prediction error with the predictor block identified by the motion vector. In HEVC, one block in a tile may be predicted from a predictor block which is partially or entirely outside of tile boundaries. Moreover, the predictor block may be also partially or entirely outside of the frame boundaries since HEVC provides a border extension mechanism to extend the border of the image to allow the predictor block to be partially or entirely outside of the reference image. Finally, the predictor block may be located at a sub-pixel location. That means that the reference block pixel value is the result of a sub-pixel interpolation filter which generates sub-pixel value from a range of up to four pixels outside of the block of pixel located at full pixel coordinate corresponding of the predictor block. As a result, temporal prediction may introduce a coding dependency between blocks within a tile and a set of pixel data located outside the tile boundaries.

A second HEVC mechanism involved in the temporal prediction consists in predictive encoding of the motion vector using a motion vector predictor. The motion vector is thus encoded as an index representing the motion vector predictor and a motion vector difference or residual equal to the error between the motion vector to be encoded and the motion vector predictor. The index of the motion vector predictor is an index in a list of motion vector predictors called candidates. The list of motion vector predictors, or candidates, is generated for each block and is composed of a set of spatial motion vectors and a set of temporal motion vectors. The list is dynamically generated depending on the coding type of the neighboring blocks. Tile boundaries break the motion vector prediction mechanism from spatial motion vector predictors but not for temporal motion vector predictor. The construction of the list of candidates being partially based on potential candidates from neighbor blocks, it introduces some dependencies to other tiles data for blocks pertaining to the tile boundaries. HEVC provides "merge" coding modes, which specify that the motion vector used for motion compensation is directly one candidate of the motion predictor list. Since generation process of the motion vector predictor lists for inter and merge coding modes are very similar, the invention applies to both inter and merge coding modes.

Some embodiments of the invention introduce an adapted process for the selection of candidates list for predictive encoding of motion vectors. According to these embodiments, when the spatial neighboring blocks are outside the tile boundaries, their motion vectors cannot be added to the list. However, for the temporal motion vector the collocated block (i.e. the block in reference picture at the same coordinate as the block to predict) is used to fill the list of candidates. In particular cases, the block located at the bottom right edge of the collocated block is used. This block may be outside of the tile boundaries. As a consequence, this prediction mechanism induces a coding dependency between the motion vector of the block in the tile and the motion vector information outside of the tile in the reference frames. For this reason, when the region of interest containing the tile is decoded and when the neighborhood of the tile is different from the neighborhood at encoding, the candidates generation process may result in different candidates lists at encoding and decoding. This may result in bad decoding of the block in the tile.

In some embodiments, the candidates list generation process is further adapted to take into account a temporal motion vector predictor from a neighbor tile only if the candidates list is the same taking into account the neighbor tile or not. This means that the right candidates list is generated in presence of the neighbor tile or in absence of the neighbor tile, but a different candidates list may be generated in presence of a different neighbor tile. In these embodiments, a tile or a set of tiles composing the region of interest may be rightly decoded if surrounded by the same neighborhood that was used at encoding, or in absence of any neighborhood, but not with a different neighborhood. In another embodiment, the temporal motion vector predictor from a neighbor tile is selected only if the selected predictor is same taking into account the neighbor tile or not. The candidate lists may slightly differ but the selected predictor value must be the same in both lists.

Finally, HEVC provides a set of loop filters which introduce dependencies between pixels of contiguous tiles. These loop filters are the deblocking filters and the SAO filter which remove some artefacts introduced in particular by the quantization of the residual blocks. HEVC provides flags in Picture Parameter Sets to indicate whether these loop filters are disabled at the tile or/and slice boundaries. When disabled, no coding dependency between tiles is introduced by these compression tools.

To enable region of interest decoding, the typical encoding solution is to disable all the previously mentioned prediction mechanisms to remove the coding dependencies between the tiles of the video stream. This leads to less efficient compression and higher bitrate for the resulting bitstream. It is proposed to adapt the activation/deactivation of the prediction mechanisms depending on the region of interest usage scenario in order to optimize the bitrate of the resulting bitstream. The HEVC standard defines a SEI (Supplemental Enhancement Information) message to indicate a set of tiles, containing one tile or more per set, that are independently decodable. In the specific case of a single tile in a tile set, this kind of tiles is named motion constrained tile. The SEI message is named "Temporal motion constrained tile sets" SEI message as depicted on non-highlighted parts of FIG. 8. It contains mc_exact_sample_value_match_flag and mc_all_tiles_exact_sample_value_match_flag flags which indicates that sample of a tile set are correctly decoded with or without other tile sets and thus that tile set is fully independently decodable. This is typically the case when all inter prediction mechanisms, meaning temporal ones, have been disabled at the boundaries of the tile set. Only parts of the samples inside the tile set are required for correct decoding of the tile. If the tile set is reduced to a single tile, it means that this tile is fully independently decodable. When the SEI is not present, there is no indication that the tiles are can be decoded independently. In such case, the tiles should be considered as dependent.

Figure 4:
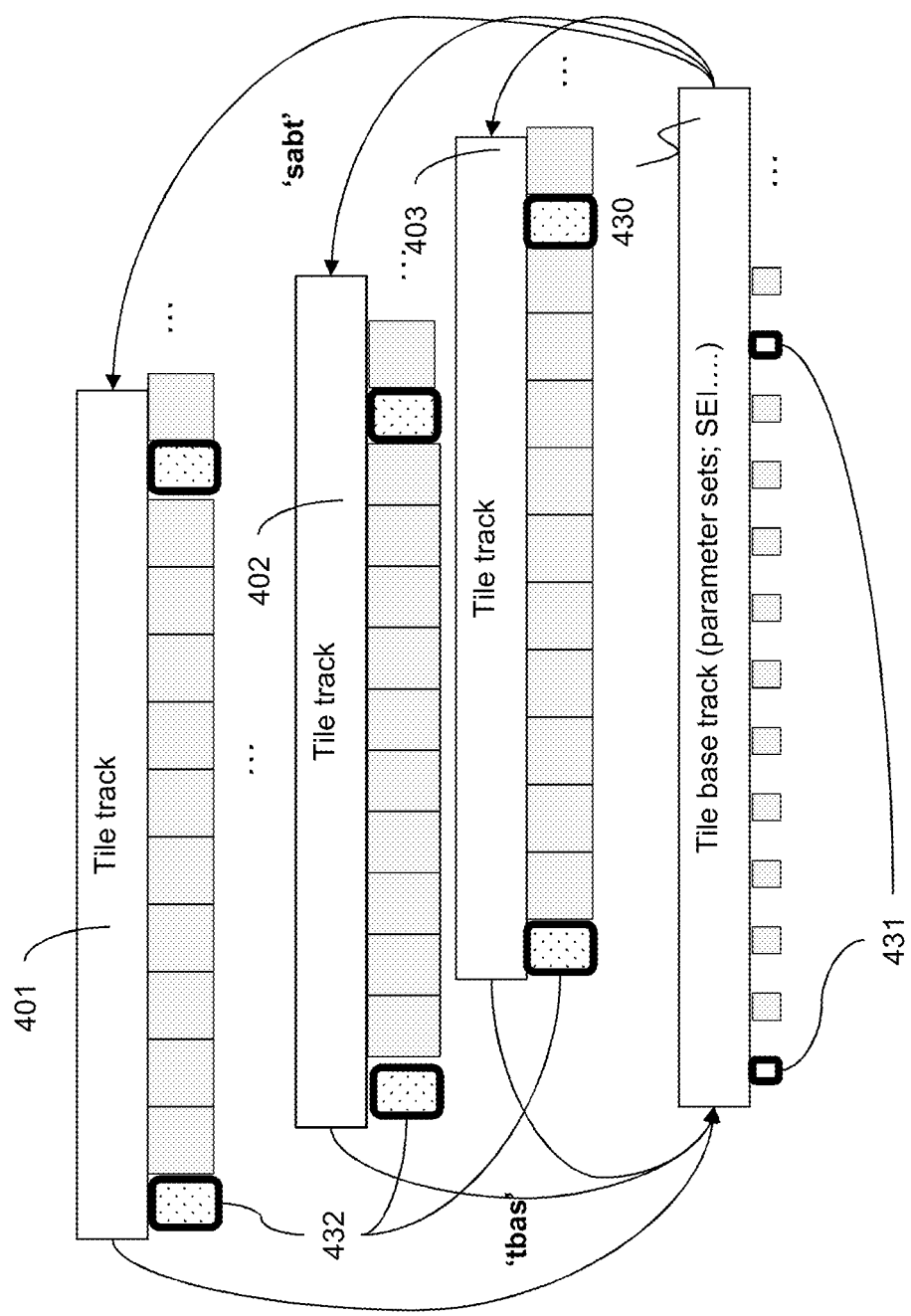
FIG. 4 illustrates the encapsulation in ISO BMFF file format.

FIG. 4 illustrates the encapsulation in ISO BMFF file format.

Encapsulation of HEVC bitstream according to the ISO Base Media File Format may be done to provide tile-based access to media data, which is particularly useful in context of HTTP streaming. This ISO BMFF format is object-oriented, it is composed of building blocks called boxes sequentially or hierarchically organized that describe the timing, structure and media information of the encapsulated bitstreams. In this file format, the video bitstream itself is contained in an 'mdat' box (for media data) and is described by a "trak" box. Each track represents a timed sequence of media, for example frames for a video track. A video track contains samples, each corresponding typically to a frame in the video sequence.

The ISO Base Media File Format for HEVC defines a specific encapsulation for HEVC tiles. The notions of tile track, tile base track and TileRegionGroupEntry allow tile-based encapsulation of HEVC-compressed videos. Each tile or set of tiles, corresponding to an independently decodable rectangular region of interest can be stored in its own track, then called a tile track (ex: 401, 402, 403). All the tile tracks of a common video share a same basis that is called a tile base track 430. While each tile track stores data and descriptive metadata for a region of interest, the tile base track stores common information applying to all tile tracks, for example Sequence and Picture Parameter Sets and SEI messages. For example 431 depicts the first Sequence Parameter Set (SPS) and an updated SPS during the vide sequence. Each tile track then depends on the tile base track containing initialization and setup information for the video decoder. This dependency is expressed in ISOBMFF by track reference types of type 'tbas' from each tile track to the tile base track. An efficient way in terms of storage and description size of describing tile arrangement and reconstruction in a video sequence is called "implicit reconstruction". It defines for every sample a reconstruction rule from the tile base track to one or a set or all the tile tracks. This is described through another track reference type 'shat' as shown on FIG. 4. Using this encapsulation, each encoded tile set or region of interest can be stored in its own tile track.

To convey information on the tile region, tile set of region of interest stored in a tile track, a specific box is used: the 'trif' box for TileRegionGroupEntry. It mainly contains the position and sizes of the tile region as well as information regarding its decoding dependencies and the use of loop filters on tile region boundaries.

The client can thus obtain a region of interest by requesting by HTTP each required tile-track and the associated tile base track. The client receives the bitstream encapsulated in the file format form presented in FIG. 4 with one or more tile tracks plus one tile base track. The decoding is then done in two steps: first the file format is parsed to reconstruct the media data of bitstream 402 from the meta data which resulted from the encapsulation at the server side. Then the bitstream is decoded by the client decoder before displaying the region of interest.

As mentioned above, HEVC tiles break most of the spatial dependencies in the current frame. Nevertheless, other dependencies are used in HEVC to optimize the compressed size of a tile set. The coding dependencies limit the possible combinations of one compressed/encoded tile set with other tile sets possibly from different video streams.

In the description relative to FIG. 2, coding dependency introduced between tiles from a same video have been listed. These coding dependencies are introduced sorted according to their decreasing impact on the compressed size of the tile set.

A first coding dependency consists in the dependency introduced by the selection of a predictor block outside tile boundaries in temporal prediction encoding modes. We consider here only temporal prediction as HEVC prevent any spatial block prediction outside a tile. Breaking this dependency by forbidding having a temporal predictor block outside a tile, or a tile set, greatly reduces the area available to find the predictor block. This has a serious impact on the efficiency of the coding, namely on the size of the compressed bitstream. Not breaking this coding dependency means that the region of interest must be decoded with a neighborhood corresponding to the encoding neighborhood, it means that no combination is possible. The complete image has to be decoded. Any region of interest extraction can only happen after the complete transmission and decoding of the frame, by cropping the decoded image.

A second coding dependency consists in the dependency introduced by the selection of a predictor block outside frame boundaries for temporal motion prediction through frame border extension mechanism. When the tile is located at the border of the frame, HEVC provides the possibility to have a predictor block that is located only partially in the picture. The part of the predictor block extending outside the picture is filled with generated pixels according to a mechanism called border extension. The border extension mechanisms consists in using the pixels on the picture boundary to fill the border. We consider here that the temporal predictor block is chosen within the tile or within the border joined to the tile, if not we fall back in the context of the first coding dependency. Considering that the set of tile constituting the region of interest may be located at another location in the composed image for decoding, it may happen that it is no longer at the border of the frame. In that case, the predictor block will be filled, for the extending part, by pixels from the neighbor tile and not by generated pixels according to the border extension mechanism. Not breaking this dependency means that a region of interest located at the border of the frame at encoding must be located at the same border of the frame at decoding. Such region of interest may be displaced only along the border. For the sake of simplicity, it may be considered that not breaking this dependency implies to decode the region of interest in place. It should be noted that this coding dependency is not related to the neighborhood, but only to the location. A border region of interest may be decoded independently of its neighborhood as long as it stays in place or joined to the same picture boundary. It may be combined with region of interest from other sequences.

A third coding dependency consists in the dependency introduced by sub-pixel interpolation filter. Allowing a predictor block to be located at sub-pixel location in the reference image means that each pixel of the predictor block has to be generated by interpolation. Interpolation involves using interpolation filter to compute the value of the pixel using the pixel values of its neighbor. The interpolation filter may have a width of eight pixels. This means that pixels close to the tile border in a predictor block may be generated using the interpolation filter based on pixel values from neighbor tiles. Not breaking this dependency means that a region of interest must be decoded in its encoding neighborhood.

A fourth coding dependency consists in the dependency introduced by deblocking filter and SAO filter. This dependency is very similar to the third one. Border pixels being subjected to a filtering have their values impacted by pixels from the neighbor tiles outside the region of interest. The consequence of not breaking this dependency is the same, at least strictly speaking. Actually, the aim of the deblocking and SAO filters is to suppress some encoding artefacts. It means that their effect is mainly to smooth the pixel values at the tile border. These filters do not change pixel values drastically. Taking this aspect into account, in some embodiments, depending on the application, the small impact on the border pixel values may be judged acceptable and combination of a region of interest with a different neighborhood may be tolerated. In some other embodiments, taking into account that deblocking and SAO filters have an impact only on border pixels, typically on a four pixels border, the region of interest may be cropped to be restrained to the inside part not impacted by the filtering. In some embodiments, the temporal motion prediction is restrained to not use a prediction block which pixels are computed from this four pixels wide border. This includes prediction blocks at a fractional pixel location close to this border due to the interpolation filter.

A fifth coding dependency consists in the dependency introduced by motion vector prediction mechanism. The motion vector prediction mechanism is based on the generation of a motion vector predictors, also called candidates, list. As detailed above in the specification related to FIG. 3, the process to build the candidates list may take into account some neighbor blocks, and therefore some neighbor tiles for border blocks. Of course, in order to allow a correct decoding the process must give the same candidates list at both encoding and decoding. This process induces a dependency to the neighbor tiles and must be broken to allow free combination of regions of interest. As described above, some embodiments use an adapted process to build the candidates list. This adapted process guarantees that the decoding will be correct either with the encoding neighborhood or in absence of neighborhood, meaning with a location of the region of interest at a frame border. But the decoding may be wrong with a different neighborhood.

It should be noted that all these dependencies have an impact on either the location of the considered region of interest at decoding or its neighborhood. Namely, each tile set coding dependency level is related to the decoding context of the set of tiles when decoded at a decoding unit, the decoding context being defined by the possible location or possible neighborhood of the set of tiles when decoded at the decoding unit.

Breaking a dependency means to forbid the involved mechanism at encoding. By breaking some of these dependencies, it becomes possible either to displace a region of interest from its location at encoding to a different location at decoding or to change the neighborhood of the region of interest, meaning to combine, in the decoded image, the region of interest with other regions of interest, from the same sequence or from other sequences. In other words, the thorough choice of allowed dependency mechanisms at encoding dictates the level of combination allowed at decoding in term of location and/or neighborhood of regions of interest.

All these coding dependencies in between are due to data prediction for one tile set from encoded data in a reference tile set. The present invention is not limited to these five tile set coding dependency types and may be generalized. For instance, in scalable extension of HEVC, an upsampling process permits to generate a new reference frame for an enhancement layer. Tile set to encode in the enhancement layer may be predicted from this reference frame which implies a new tile set coding dependency with the upsampled base layer frame.

According to one aspect of the invention, based on the kind of recombination needed for a given usage of the regions of interest, it is searched to find the minimal set of dependencies that need to be broken in order to allow the desired recombination. As each dependency break degrades the efficiency of the encoding, avoiding breaking unneeded dependency improves the encoding.

The encoder is configured to control the tile set coding dependencies introduced by the coding to fulfil specific usage requirements.

According to an embodiment of the invention, a scale of coding dependency levels for tile sets is defined to configure the encoder. Each level of the tile set coding dependency scale (referred in the following as tile set coding dependency level or TCD level or TCDL) indicates a set of prediction mechanisms which are disabled or enabled. It should be noted that TCD level and TCDL applies the same way when encoder always encodes each tile in its own tile set.

For example, in one embodiment the following TCD scale may be defined corresponding to example of usage scenarios.

A tile set coding dependency level equal to zero corresponds to a configuration where the encoder disables all prediction mechanisms introducing tile set coding dependencies. In particular, the data used for prediction is located only within boundaries of current tile set in current and previous encoded frames. The motion vector predictor list is derived only from predictor within tile set boundaries. All the motion vector predictors from the temporal predictor candidates list are systematically discarded and not selected. All loop filters are disabled at tile set boundaries. Motion vectors with sub-pixel interpolation are not allowed when the sub-pixel DCT interpolation filter (DCTIF) is using pixel outside tile set boundaries.

This level equal to zero corresponds to usage scenario where a free mosaic of regions of interest from one or several video streams may be generated.

A tile set coding dependency level equal to one corresponds to a configuration where prediction mechanisms between data of different tile sets are enabled under the following constraints. Motion predictions outside frame boundaries are allowed for specific tile set and frame boundaries. The specific tile sets are the tile sets which share a boundary with the frame. For each of these tile sets, the motion prediction is authorized only across the boundaries which are common to the tile set and the frame. All other prediction mechanisms introducing tile set coding dependencies are disabled. Thus in particular cases, data may be predicted from generated data on the boundaries of the frames according to the border extension mechanism. Only tile sets which are on the edges of the frame are concerned. It reduces the bitrate while ensuring that each tile set is decodable without reference to data which cannot be retrieved when the tile set is decoded without other tile sets.

However, it implies also restrictions on the usage conditions of the tile sets. In particular, when generating a new mosaic video stream from a composition of tile sets from one or several video streams.

In addition, HEVC provides a mechanism to crop the coding tree unit on the right and bottom edges of a frame when the width and/or height of the frame is not corresponding to a multiple of the coding tree unit. The encoding of coding tree units on theses edges is particular: the coding tree unit are subdivided systematically to match the size of frame. A tile set which includes such kind of coding tree units should be decoded in place (or more precisely joined to the same edges of the picture). In one embodiment, the TCD level of these tile sets is equal to one.

This level equal to one corresponds to usage scenario where a mosaic of regions of interest from different video streams may be generated with the constraint that the location of the regions of interest must be preserved, at least for the regions located at frame borders. By preserved it means that the location of the region of interest tile sets location is preserved with respect to the picture edges. The tile sets may be moved along the picture edge.

A tile set coding dependency level equal to two corresponds to a configuration corresponding to the configuration of the level equal to one where, in addition, further prediction of data between the tile sets is authorized with additional constraints. The temporal motion predictor is enabled in the derivation list mechanism with specific condition. In the motion vector predictor derivation mechanism the predictors after temporal predictor are may be selected if and only if the predictor value is the same when both derived with and without the neighbor tile sets of the video stream. The bitrate is further reduced but new constraints apply on the usage of the tiles sets for mosaic content generation. Indeed, the motion predictor list is correctly derived if and only if the tile set is decoded without neighbor tile sets or with the neighbor tile sets as encoded in the video stream. If the neighbor tile sets are replaced by other tile sets the decoding may not be correct.

This level equal to two corresponds to usage scenario corresponding to a partial decoding of one or several regions of interest in a video sequence.

A tile set coding dependency level equal to three corresponds to a configuration where, in addition to the configuration corresponding to level two, the encoder is configured to enable deblocking filter and SAO filter at tile set boundary. Tile set artefact is possible close to tile set which are not decoded with their original neighbors.

This level equal to three corresponds to usage scenario corresponding to a decoding of one or several regions of interest in a video sequence while allowing minor decoding artefacts on a band of pixels on interior boundaries of the regions of interest. In one embodiment, the client applies a cropping of a band of pixels on the regions of interest interior boundaries to hide the artefacts.

A tile set coding dependency level equal to four corresponds to a configuration where the encoder uses all prediction mechanisms between the tile sets. The tile set cannot be independently decoded. Mosaic content generation is feasible only with cropping mechanisms. The bitrate might be better than a combination of several tile sets but requires more memory to decode the mosaic.

This level equal to four corresponds to usage scenario corresponding to a complete decoding of a video sequence.

Tile set coding dependency levels 0 and 4 corresponds to extreme configuration where a complete coding independence is provided for regions of interest for level 0, and no independence at all is provided for level 4.

Tile set coding dependency levels 1, 2 and 3 correspond to intermediate levels focusing on prediction information that may be accessible to the client even if he requested only a limited set of tiles. He could be the case if the tile is located at the border of a frame or if the prediction information is located in the same set of tiles but in frames previously sent.

In one embodiment, the level 3 is removed since it may introduce visual artefacts.

In another embodiment, a TCD level is associated with each tile set. That means that a first tile set of the same frame is encoded using a first tile set coding dependency constraints while a second tile set uses different constraints. In practice, a TCD level array of size equal to the number of tile sets in the tile grid is generated. Each i-th item of array corresponds to the TCD level associated to the i-th tile set. The array is used to configure the constraints applied for each tile set by the encoder.

It should be noted that in the presence of a HEVC bitstream, if the frame size (width and/or height) is not a multiple of a CTU block size, a quadtree that split an incomplete CTUs, on the right and/or bottom of the frame, is automatically inferred to have CU boundaries matching with the frame boundaries. Such splitting is not encoded, and no texture information is encoded for the quadtree part that is outside of the picture. It means that such a tile set containing incomplete CTUs, so containing incomplete tiles, will not be decoded properly if it is moved anywhere else than on a tile set position that will induce the same automatic CTU splitting. As well, in such a context a normal, meaning complete, tile set with tiles containing only complete CTUs will not be properly decoded if it is moved at a position where an incomplete tile set would normally be present, even if the size expressed in number of CTU is the same.

In some embodiments, such information is signaled using new specific TCD Levels. Alternatively, it may be considered that no signaling is required if the client is aware of this codec restriction and so will not use incomplete tile set at a complete tile set position, and conversely that will not use complete tile set at an incomplete tile set position. Another alternative is to express the size of the tile set in number of pixels, instead of number of CTUs, so that the client knows exactly that the tile set's sizes are not the same, and so will not confuse between complete and incomplete tile sets.

The tile set coding dependency level is added in the bitstream to make it possible for the client to determine the coding dependencies of each tile set with other parts of the video sequence. For this reason, the server generates tile set dependency information. This tile set dependency information is then associated to the tile set.

In a first embodiment, the tile set dependency information is specified in the Elementary stream. Typically, the tile set coding dependency level is added in a new SEI message. The SEI message contains a list of tile set coding dependency level specified on 4 bits. The index of the tile set coding dependency level in the list is the index of tile set in the frame. In another embodiment, the location of each tile set is specified in the SEI message. For instance, the pixel row and column of the top left edge of the tile set and its width and height is associated to the coding dependency level. Each entry of the SEI message is a 5-uplet of (x, y, w, h, l) form where x and y are the x-axis and y-axis coordinates of the tile set; w, h are respectively the width and the height of the tile set and finally l is the coding dependency level of the tile set.

An example of SEI message is illustrated in FIG. 13, wherein:
num_sets_in_message_minus1 is the number of tile sets that are predetermined.
Tile_set_id[i] is the unique identifier of the $i^{th}$ tile set
Top_left_tile_index[i] is the tile index of the first tile in the $i^{th}$ tile set
Bottom_right_tile_index[i] is the tile index of the last tile in the $i^{th}$ tile set
One_or_more_slice_flag[i]: is a flag. When true it indicates that at one or more slice is used for the tile sets.
Tile_set_prediction_dependency[i] is the tile set prediction dependency value which corresponds to the TCD level used by the encoder for the $i^{th}$ tile set.

According to embodiments finer tile set coding dependency levels are used in order to differentiate between top-left, top, top-right, right, bottom-right, bottom, bottom-left and left neighborhood. For instance, the signaling may indicate that the right tile set is mandatory for the decoding of the current tile set but that other neighboring tile sets may be different or even absent. This can be done by signaling one dependency level for each neighboring tile set for instance, but it may introduce redundant information: for instance if the tile set can be decoded at a different position it will be true whatever are the restrictions regarding other tile sets. Thus, the redundant signaling can be factored with one global TCD level for the tile set, and specific TCD levels for each neighboring tile set.

According to alternative embodiments, the tile set coding dependency level does not represent an ordered level of dependency constraints/encoding restrictions, but rather express a set of dependency constraints satisfied by a tile set. The TCD level just represents a set of configurations. For instance, a field of bits may be used where each bit represents a dependency constraint satisfied by the tile set. As an example, there could be a first bit signaling that the tile set can be decoded without decoding any neighbor tile or tile set, a second bit signaling that the tile set can be decoded at another location, and a third bit signaling that the tile set can be decoded with a different neighborhood. Thus, a tile set having a TCD level of 3 for instance (first and second bits set to 1) can be decoded at a different location without a tile set neighborhood or with its original tile set neighborhood, but cannot be decoded with different tile set neighborhood. As well, a tile set having a TCD level of 5 for instance can be decoded with a different neighborhood but cannot be decoded if it is displaced at another location. This may be a tile set on a boundary that uses border extension for its motion prediction, for instance.

In a preferred embodiment, several flags may be used to parameterize the TCD level. An example of SEI message is illustrated in FIG. 14, it defines three flags for instance named mcts_motion_vectors_over_pic_boundaries, mcts_exclude_loop_filter_margin and mcts_temporal_motion_vector_predictor_flag flags. Each combination of values for these three flags represents one TCD level.

The semantic of the different fields may, for example, be the following:
num_mcts_context_in_minus1 indicates the number minus 1 of sets of context information specified in the motion constrained tile sets (mcts) context information SEI message.
mcts_context_id[i] identifies the i-th tile set with mcts_id equal to mcts_context_id[i] associated to the i-th context information set.
mcts_slice_encapsulated_flag[i] equal to 1 specifies that all the coding tree units of the tile set with mcts_id equal to mcts_context_id[i] are contained in one or more slice. In addition, this one or more slice contains only coding tree units of the tile sets with mcts_id equal to mct_context_id[i]. Otherwise when equal to 0 coding the one or more slice may include coding unit of tile set with mcts_id different than mcts_context_id[i].

When mcts_slice_encapsulated_flag[i] is equal to 0, the tile set extraction process may remove bytes corresponding to coding tree unit belonging to another tile set to obtain a NAL unit containing only data related to the tile set with mcts_id equal to mcts_context_id[i].

mcts_motion_vectors_over_pic_boundaries[i] when equal to 0 indicates that no sample outside the picture boundaries nor sample at a fractional sample position for which the sample value is derived using one or more samples outside the picture boundaries is used for inter prediction of the i-th tile set with mcts_id equal to mcts_context_id [i]. Otherwise when equal to 1 the inter prediction may use sample outside one picture boundary and sample at a fractional sample position for which the sample value is derived using one or more samples outside one picture boundary when the picture boundary is shared with the i-th tile set with mcts_id equal to mcts_context_id[i].

When mcts_motion_vectors_over_pic_boundaries[i] is equal to 1, tile set extraction process shall not use a tile setup, meaning a given combination of tile sets, for which the tile set with mcts_id equal to mcts_context_id[i] is not sharing the same boundaries with the picture boundaries.

When mcts_exclude_loop_filter_margin[i] equal to 1 indicates that no sample inside the margin around the tile boundaries which are modified by loop filters nor sample at a fractional sample position for which the sample value is derived using one or more samples from this margin is used for inter prediction of the i-th tile set with mcts_id equal to mcts_context_id [i]. Otherwise the when equal 0, the inter prediction may use sample within this margin.

When mcts_exclude_loop_filter_margin[i] is equal to 0, tile set extraction process shall not use a tile setup for which the tile set with mcts_id equal to mcts_context_id[i] is decoded with other tile set different from the tile set at encoding.

mcts_temporal_motion_vector_predictor_flag[i] when equal to 0 indicates that the candidates list generation process for temporal motion vector prediction is constrained such that the predictor selected in the list of candidates is never the bottom right motion vector when the bottom right motion vector in the collocated block is outside the i-th tile set with mcts_id equal to mcts_context_id [i]. Otherwise when equal to 1 indicates that the derivation process for temporal motion vector prediction is constrained such that the decoding of the motion predictor is the same when decoded with or without the i-th tile set with mcts_id equal to mcts_context_id [i].

When mcts_temporal_motion_vector_predictor[i] is equal to 1, tile set extraction process shall not use a tile setup for which the tile set with mcts_id equal to mcts_context_id [i] is decoded with other tile sets different from the tile sets at encoding.

In another embodiment, a processing unit generates and inserts information related to the tile coding dependency encoding context (TCC) in an existing tiled video stream. The processing unit is for instance a proxy server that takes as input DASH or encapsulated (for example in ISOBMFF) segments and serves modified DASH or encapsulated segments which include the TCC information. The processing may be also included in the System File writer 504 of FIG. 5.

The processing unit parses the elementary streams and determines the tile grid configuration for each frame. Then, it forms a tile set for instance, in a preferred embodiment, by associating one tile set identifier to each tile. Each tile set is thus composed of a single tile. In alternative embodiments, more tiles are associated to one tile set identifier.

The processing unit then decodes the video stream and analyses the inter prediction parameters used for each tile set. The processing unit generates a motion-constrained tile set context information SEI message accordingly to the decoded motion vector values, the selected motion vector predictor in the predictor list and the loop filter configuration:

The processing unit sets the mc_exact_sample_value_match_flag flag of the i-th tile set equal to 1 when all the following conditions are fulfilled:

All the prediction blocks of the i-th tile set are predicted from a reference block that has no sample or no fractional sample predicted from samples outside of the tile set boundaries.

For each inter prediction block of the tile set, the selected motion vector predictor in the derived list is identical when derived with our without neighboring tile sets.

The processing unit sets the mc_exact_sample_value_match_flag flag of the i-th tile set equal to 0 when the following conditions are fulfilled:

All the prediction blocks of the i-th tile set are predicted from a reference block that has no sample or no fractional sample predicted from samples outside of the tile set boundaries except samples on the picture margin when the tile set shares its boundary with one of the picture boundary. The samples should be located in the margin computed from the pixel on the vicinity of the shared boundary. The picture margin contains the pixels generated with picture border extension mechanism.

For each inter prediction block of the tile set, the selected motion vector predictor in the derived list is identical when derived with our without neighboring tile sets.

In addition, for each tile set prediction unit, the processing units set the motion-constrained tile set context information field to the following values:

mcts_context_id [i] is equal to mcts_id[i] value used for the i-th tile set in MCTS tile set SEI message.

mcts_slice_encapsulated_flag [i] is equal 1, if the i-th tile set is encapsulated in one or more slices without CTUs from another set. Otherwise the flag is set to 0.

mcts_motion_vectors_over_pic_boundaries [i] is set to 0 when each prediction block of the i-th tile set is predicted from samples inside the tile set boundaries. Otherwise this flag is set to 1.

mcts_exclude_loop_filter_margin[i] is set to 1 when loop filter is enable on the tile set boundaries. Otherwise this flag is set to 0.

mcts_temporal_motion_vector_predictor_flag [i] is set to 0 when the bottom right motion vector predictor is never used when outside the tile set. Otherwise the flag is set to 1.

When decoding the stream, the client parses the motion-constrained tile set context information SEI message and determines the tile set coding dependency level of each tile. Depending on this information, the client determines which kind of combination is feasible with each tile set depending on the value of the vector (mcts_motion_vectors_over_pic_boundaries, mcts_temporal_motion_vector_predictor_flag, mcts_exclude_loop_filter_margin) for instance:

(0,0,0): The tile set is decodable alone or at any position with any neighbour tile sets including tile sets of a different video stream (0,1,0): The tile set is decodable alone or at any position with:
Same bottom, right and bottom right neighbour tile sets and
Any other neighbour tile sets including tile sets of a different video stream (1,0,0): The tile set is decodable alone or with any neighbour tile sets including tile sets of a different video stream with the constraint that tile sets boundaries common with picture boundaries are maintained in the combined video stream (1,1,0): The tile set is decodable alone or with:
Same bottom, right and bottom right neighbour tile sets and
Any other neighbour tile sets including tile sets of a different video stream
with the constraint that the tile set boundaries common with picture boundaries are maintained in the combined video stream:

(0,0,1): The tile set is decodable alone or at any position with any neighbour tile sets including tile sets of a different video stream with potentially some decoding artefacts on the band of 4 pixels wide inside the tile sets boundary. When decoded with same neighbour tile set as during encoding, there is no artefact for the band of 4 pixels in between the tile set and its neighbour except for the two 4×4 pixels wide block on the corner of the tile set in this band of 4 pixels.

(0,1,1): The tile set is decodable alone or at any position with:
Same bottom, right and bottom right neighbour tile sets (no decoding artefacts in the band of 4 pixel in between the tile set and the neighbours) and
Any other neighbour tile sets including tile sets of a different video stream with potentially some decoding artefacts on the band of 4 pixels wide inside the tile sets boundary. When decoded with same neighbour tile set as during encoding, there is no artefact for the band of 4 pixels in between the tile set and its neighbour except for the two 4×4 pixels wide block on the corner of the tile set in this band of 4 pixels.

(1,0,1): The tile set is decodable alone or with any neighbour tile sets including tile sets of a different video stream with potentially some decoding artefacts on the band of 4 pixels wide inside the tile sets boundary and with the constraint that tile sets boundaries common with picture boundaries are maintained in the combined video stream. When decoded with same neighbour tile set as during encoding, there is no artefact for the band of 4 pixels in between the tile set and its neighbour except for the two 4×4 pixels wide block on the corner of the tile set in this band of 4 pixels.

(1,1,1): The tile set is decodable alone or with:
Same bottom, right and bottom right neighbour tile sets and
Any other neighbour tile sets including tile sets of a different video stream
with the constraint that the tile set boundaries common with picture boundaries are maintained in the combined video stream: with potentially some decoding artefacts on the band of 4 pixels wide inside the tile sets boundary except when the neighbour tile sets is the same as in during the encoding.

Figure 5:
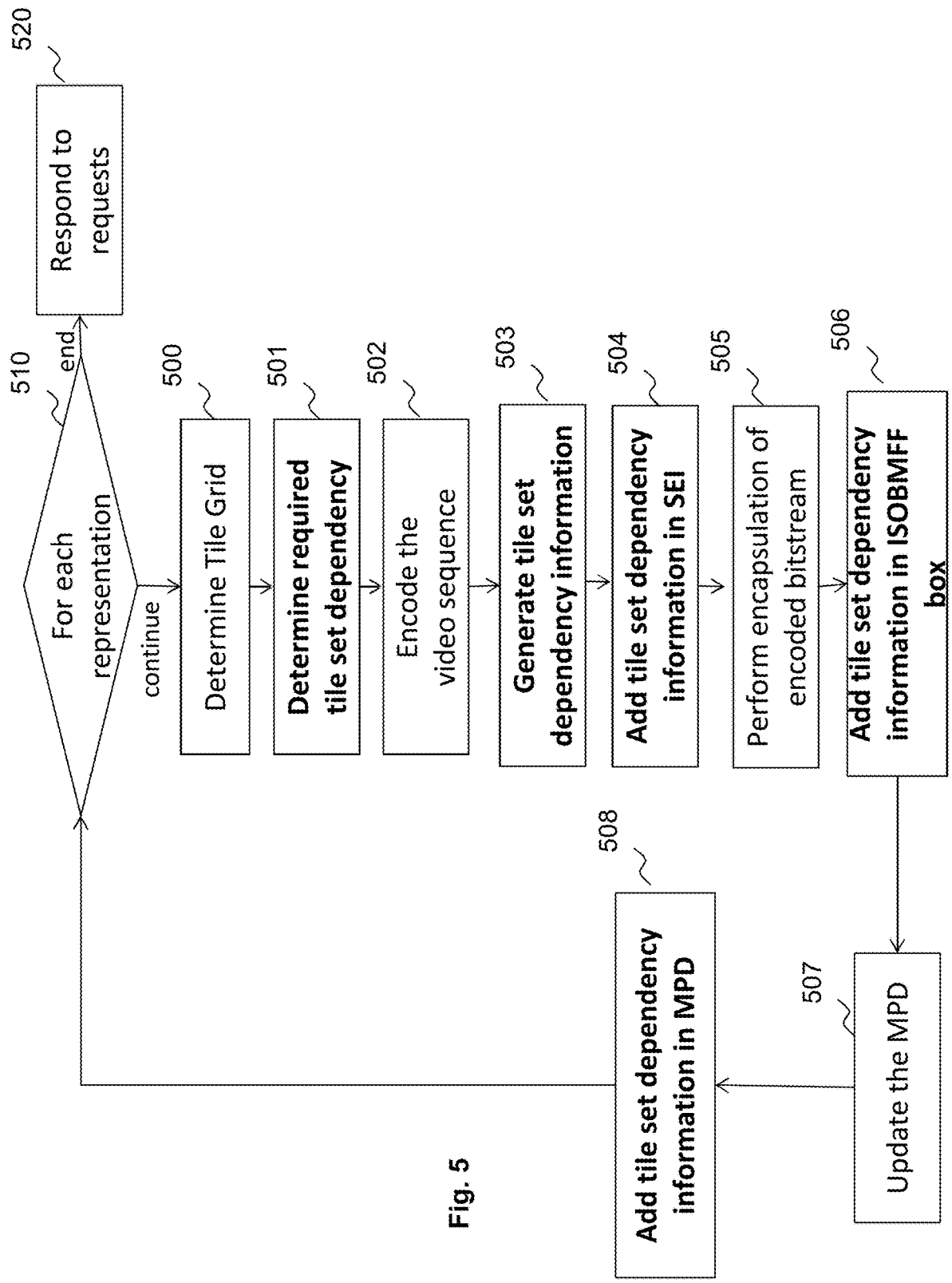
FIG. 5 illustrates the different steps of the method implemented by the server in an embodiment of the invention.

FIG. 5 illustrates the different steps of the method implemented by the server in an embodiment of the invention.

The server processing is split in two major parts. First, an initialization phase, the loop comprising the steps 500 to 510, is in charge of generating the media files and associated description files, the manifest. Then, the second processing part consists in responding to client requests, step 520.

The initialization phase is an iterative processing loop applied to each tile or set of tiles or video part to encode. Indeed, the server has to generate a set of media segments for all the input tiles, tile sets or regions of interest. The generated media segments allow streaming clients or media players to request or play the video based on one tile, tile set of video part. Describing the so-generated media segments during encapsulation step 504 and in particular their alternative representations parsed in step 510, for example in a DASH MPD updated in step 505, allow streaming clients to dynamically adapt the media transmission to the network characteristics. Several versions of the same video part (for example tile or tile set) are thus provided with different encoding bandwidths, resolutions and/or encoding qualities. The media presentation description generated in step 505 provides sufficient description for the streaming clients to select and combine several regions of interest of video streams from all the input streams. This can be useful when the application consists in rendering a mosaic of videos. Finally, the server encodes several representations of input video parts with different encoding parameters of resolution, bandwidth, ROI size, combination possibilities with other streams. The processing steps 500 to 505 are successively applied to each alternative representation.

More precisely, in a step 500, the video sequence is divided in regions of interest composed of tiles or set of tiles using a predetermined tile grid parameter. For instance, tile grid might be a uniform division of the input frames in spatial regions. According to a more complex variation, the grid could also be controlled by an image analysis module or an object detection module embedded in the server 100 or communicating with the server 100. The grid can be static or it may change over time. HEVC supports dynamic grid by encoding a new Picture Parameter Set. The number of tiles per frames being determined in function of the input frame resolution and/or the minimal size of the ROI. Typically, one or more tiles are used per region of interest. In the following we call the one or more tiles covering the region of interest the tile set.

In the step 501, the encoder is configured depending on the usage scenario of video streams. The lower is the coding dependency level configuration for the encoder the higher is the bitrate. The coding dependency between tiles is broken only when needed by the usage scenario. The levels and usage scenarios described in the example above may be used.

The video sequence is then encoded in step 502 based on the tile set coding dependency level determined in step 501. The encoding process applies the tile set coding dependency constraints associated to the tile set coding dependency level for each tile set of the tile grid as determined in step 500.

The encoding of the video sequence in step 502 aims at providing an improved quality for a predetermined bitrate. The coding dependencies introduced by these prediction mechanisms remove the information redundancy of the bitstream. On the other hand, these tile set coding dependencies limit the combination possibilities of these tile sets with other tile sets possibly from different streams.

In a step 503, the signaling information indicating the tile set coding dependency level is generated to be inserted according to one of the described embodiments in the bitstream.

For instance, in a step 504 the generated SEI with the tile coding dependency information is inserted in the elementary stream.

Then the encoded bistream is encapsulated in, for example, ISO Base Media File Format in a step 505. For instance, a trif box is inserted in the file with the tile coding dependency information in step 506. The description file is updated with information regarding the newly encapsulated file in step 507. For example, the description file includes tile coding dependency information generated in step 508.

Once the processing loop formed of step 500 to 510, the server is able to serve the media streams using MPEG DASH, for example. The server then handles all the requests in step 520. Typically, the server may receive request for the manifest file which has been generated for each video stream during step 507 and 508. On reception of such requests, the server sends the MPD document. This MPD is then parsed by the client to perform a set of media streams requests. The server responds to these media stream requests in step 520.

Figure 6:
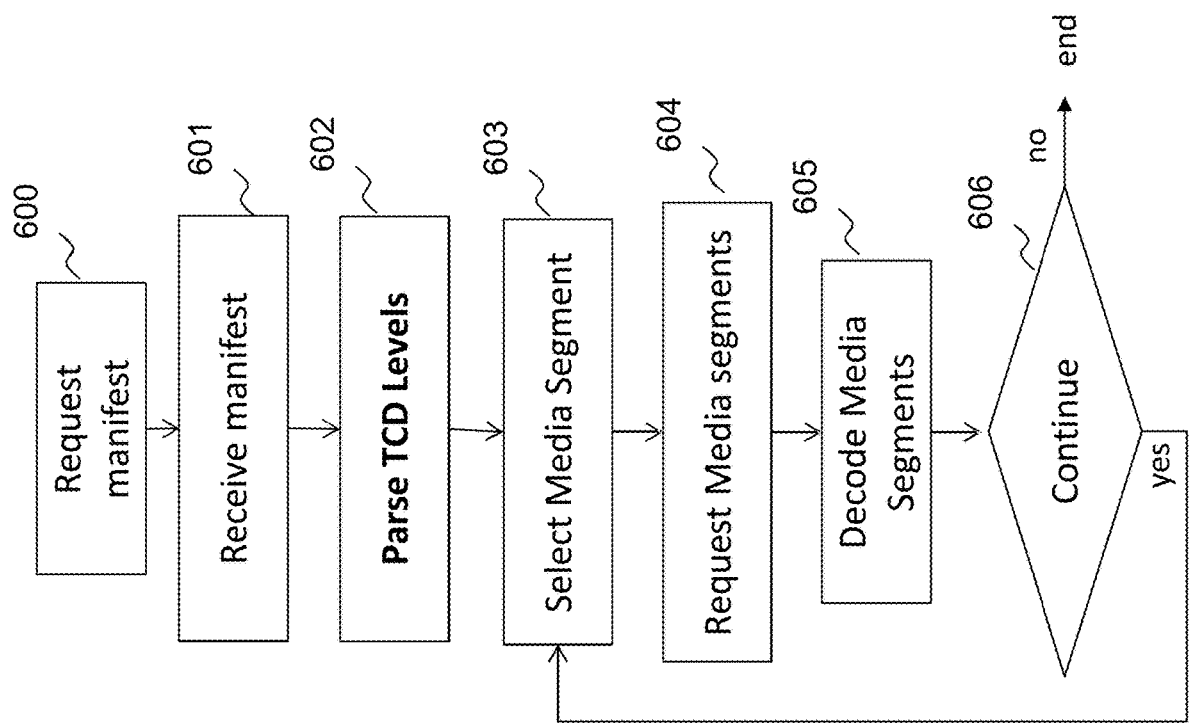
FIG. 6 illustrates the different steps of the method implemented by the client in an embodiment of the invention.

FIG. 6 illustrates the different steps of the method implemented by the client in an embodiment of the invention.

The client general processing consists in selecting a set of media segments needed to display a set of tiles, for example corresponding to a region of interest or being part of a composite video like a video mosaic. It may also corresponds to parts of a panoramic video at different qualities. For instance, the client may request one or more tile sets from a single media stream. In another use case, the client requests several tile sets from different media streams and combines them to form a new mosaic video stream.

The processing starts by requesting the manifest file in a step 600. On reception of the manifest file in a step 601, the client parses the different parameters. The client extracts the tile coding dependency level for each representation at step 602. This parsing step is detailed with reference to the FIG. 17. As a result, it is able to determine the combination possibilities of each representation, typically corresponding to a tile set, with other representations in the MPD.

In step 603, the client retrieves the appropriate tile set(s) required to fulfill the usage scenario envisaged by the user. The selection of the corresponding representation(s) is performed according to following steps:

First, the set of representations corresponding to each selected tile set is determined For each Representation, it is determined if the TCD level match the combination scenario of the client. The representation is removed from the set when the TCD level is not compatible. This forms a second set of representations.

The client stops and returns an error message when last processing steps removes all the representations corresponding to one tile set. Otherwise, the processing continues with following step.

The second set of representation is refined in function of the required streaming characteristics. For instance, the representations which maximize the quality of each tile set under a bandwidth limitation are selected.

For instance, the user needs a mosaic video of tile sets from different video streams which will be merged to form a new bitstream. The server has thus generated a set of video streams, which shares common encoding configuration and Parameters Sets are supposed to be identical. The locations of the selected tile sets may differ from their original locations. In such cases, the client needs to transcode the slice headers of each tile to change the address of the first CTB in the slice to the new location of the tile. This transcoding step is applied as preliminary step of decoding. As a result, during step 603, the client selects the representation with a TCD level equal to 0. If the set of selected representations is not sufficient to meet the user requirement, an error is returned to the user to indicate that the combination is not possible without a loss of quality. Indeed, the client needs to download not only the representation corresponding to the required tile set but also to all the representations sharing a coding dependency with the required tile sets. The bandwidth is not optimally used and it is probably better to download a non-tiled version of all the video streams that will then be decoded, cropped and finally arranged to generate the video mosaic. Another approach consists in selecting only the representations associated with required tile sets and indicating that potentially the decoding may fail. Decoding artefacts will be displayed since data required for the prediction may be missing. These fallback mechanisms provide a non-optimal solution. For these reasons, in the preferred embodiment the manifest file generated by the server describes at least two versions of each tile set: one with a TCD level equal to 0, and one with a TCD level equal to 2.

A second selection step consists in selecting the representation which bandwidth matches the characteristics of the network: the finally selected representations correspond to the highest possible quality (in terms of resolution, frame rate and encoding quality) for a given bandwidth.

The media segments in the selected representation are then requested in a step 603 and then decoded in a step 604. When the HEVC tiles have been combined, a preliminary transcoding step permits to change the slice segment header parameters of the independent slice segments of the tile. The address of the first CTB in the tile is modified to correspond to the decoding location of the tile. This step can be performed at the client side, or at the server side. In the case of ISO Base Media File Format usage, some specific extractors may be included in the file to do this automatically.

The steps of media segment selection 602, request 603 and decoding 604 are applied successively in a processing loop which ends until the end of the stream is reached or when the streaming is stopped by the user.

Figure 17:
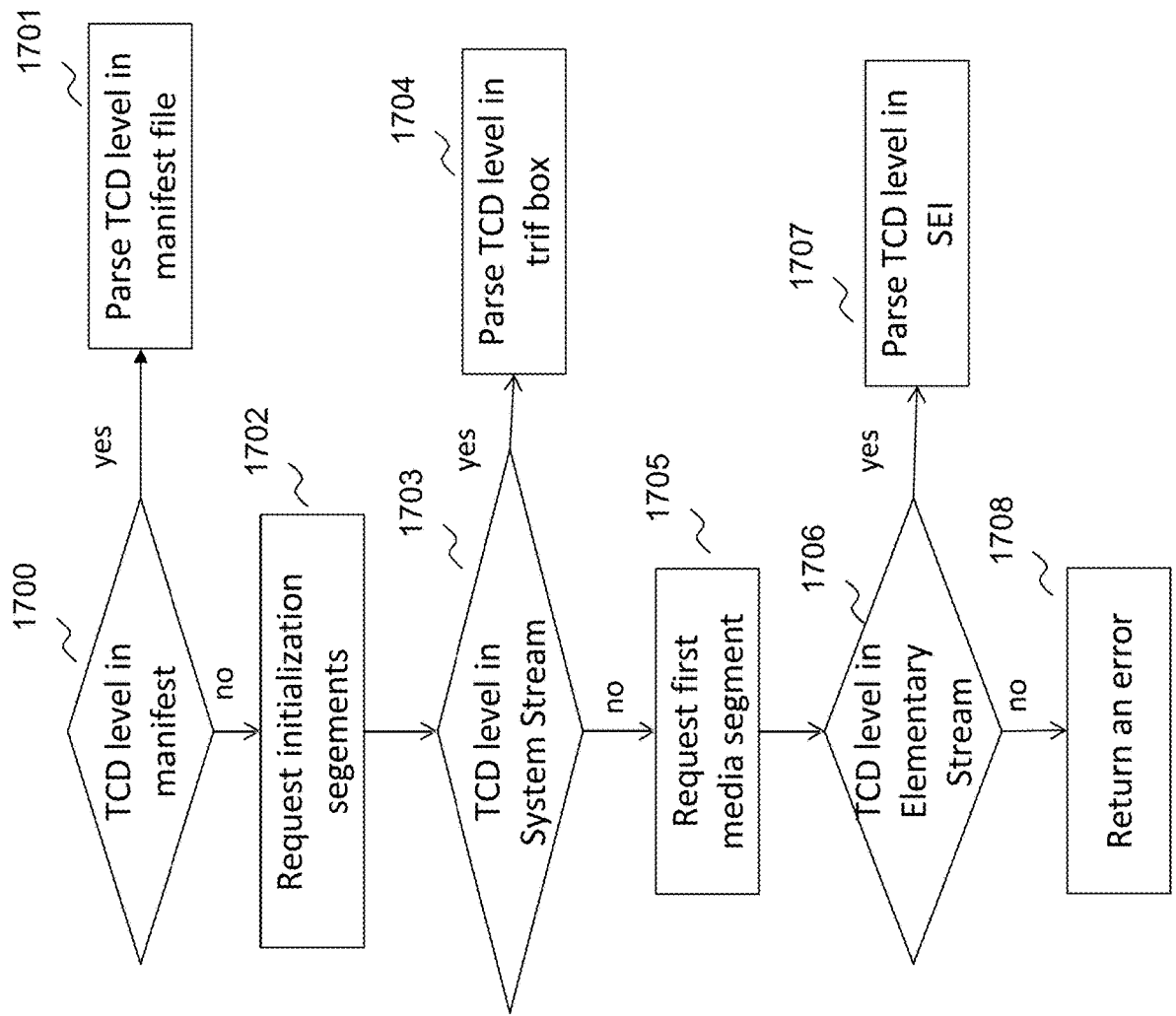
FIG. 17 represents a block diagram of a parsing method of tile sets coding dependency information according to an embodiment of the invention.

The parsing of tile set coding dependency information of step 602 is illustrated by FIG. 17. It starts by the analysis of the description file in step 1700. The client parses in a step 1701 tile set coding dependency information introduced in step 508 when present in the description file. The client associates the parsed information with each Representation of the description file. When tile set coding dependency information is not present in the description file, the client requests in a step 1702 the initialization segments of each Representation. The objective is to determine if the File System encapsulation contains data representing tile set coding dependency information. The client parses successively each media initialization segments and determines if tile set coding dependency information is present in the boxes of the ISO Base Media File Format in a step 1703. When present, the client extracts the value of TCD level from the File Format and associate the TCD level to the Representation corresponding to the parsed initialization segment. Otherwise, the tile set coding dependency information is not present in at File Format level. The client continues the processing by checking whether SEI messages are present in media initialization segment. When not present, the client requests the first media segments in a step 1705 to further checks in step 1706 if SEI messages are associated to the first media samples. The client determines if one of the SEI messages encoded in the elementary stream may contain the tile set coding dependency information. If none of the SEI message specifies the tile set coding dependency information, the client returns an error to the application in step 1708 since the combination of tile sets may not be feasible. Otherwise, the client parses the TCD level parameterized in the SEI message in step 1707. The client attributes the TCD level to the Representation corresponding to the elementary stream that contains the SEI message.

FIGS. 7a and 7b illustrate two different usage scenarios examples for the combination of regions of interest.

For instance, the FIG. 7a represents two frames 700 and 701 from two different video streams that are constituted of four regions of interest. The first video stream 700 has a high quality encoding parameters and the second 701 is a low quality and thus low bitrate version. The client efficiently combines a high quality version of the region of interest #3 with low quality regions of interest for regions 1, 2 and 4. This permits to emphasize the quality of the region of interest #3 while maintaining the bitrate relatively low for the other, less important, regions.

In a second example, a set of four video streams (703, 704, 705 and 706) are represented in the FIG. 7b. In this usage scenario, the client forms a new mosaic video of different regions of interest of each video stream. It rearranges or combines the region of interest of each video stream to a new location in the resulting video stream.

FIGS. 8, 9a, 9b and 10 illustrate different examples of tile set coding dependency levels signaling information.

In the preferred embodiment illustrated by FIG. 8, the temporal motion constrained tile sets SEI message is modified as shown with highlighted parts of FIG. 8. Initially, this SEI message is used in HEVC to indicate that a set of tiles are encoded such that they can be decoded independently of any coding unit outside of this tile set. It is a kind of binary information which indicates whether the tile set is independently decodable or not. The tile boundaries in a Temporal Motion Constrain tile set with mc_exact_sample_value_match_flag equal to 1 are treated as picture boundaries. This may corresponds to the Level 0 of the tile set coding dependency level. In this invention, we proposed to add new fields to specify more precisely the tile set coding dependency level when not equal to 0. For instance as illustrated in FIG. 8, mc_all_tiles_exact_tcdl_value_match_flag is a flag that when set to true indicates that all tile sets share the same TCD level value specified by a new identifier for the TCD level for the tile sets. For example, on FIG. 8, it is called: mc_all_tiles_temporal_coding_dependency_value_match_idc field. On the contrary, when the flag is false, the tile set coding dependency level is different for each tile set. In such a case, a new parameter is defined in the SEI message, for example: mc_temporal_coding_dependency_value_idc, to specify the TCD level for the concerned tile set. The name of the parameter here is just an example.

In another embodiment illustrated by FIGS. 9a and 9b, the tile set decoding dependency information is specified or replicated at the System Stream level meaning. By System level, we mean encapsulation of the video stream with other media streams, like for example one or more audio tracks, subtitles, metadata tracks and possibly other video tracks. There exists several encapsulation formats: Matroska, WebM, ISO Base Media File Format (ISOBMFF) . . . . In a preferred embodiment, we consider the ISOBMFF (we also talk about mp4 format) for the construction of the encapsulated stream in step 504 of FIG. 5. The module in charge of the mp4 encapsulation is called an mp4 writer (the pending module at client side, for example in a media player, is called a mp4 parser). For ISO Base Media File Format, a tile region descriptor is defined in ISO/IEC 14496-15 $4^{th}$ edition. It is a VisualSampleGroupEntry identified by the 'trif' four characters code. Note that a tile region can consist in one or many HEVC tiles and then in one or more tile sets (motion constrained or not). It can also encapsulate one tile set of many tile sets, the 'trif providing the positions and sizes of the so-encapsulated tile region. The client can use this information to determine the possible combinations of tile sets of the bitstream with other tile sets.

This VisualSampleGroupEntry can be extended to inform media players at System level that a video stream can be played or decoded in a different context than its original context. This can be expressed at System level either by embedding the TCDLevels of the motion constrained tile sets in the encapsulated stream or by embedding the set of flags from the mcts_context_info SEI message in the encapsulated stream. Depending on how a spatial part or tile set of the video is encapsulated in ISOBMFF (one single track with mapping of the NAL units to the tiles or one track per tile set or spatial part), different signaling are proposed.

When, at step 504, a mp4 writer encapsulates the video stream having motion constrained tile sets as a set of tile tracks plus a tile base track (like the example depicted on FIG. 4), with, for example, one tile track per motion constrained tile set, it can be more efficient to reflect the information of the mcts_context_info SEI message at the tile track level so that the player is more rapidly informed on the track properties, without inspecting deeper in the file. This information can then be placed at track header level to inform on the decoding context and eventual reusability of the encapsulated tile set. For example, one or more new values for the flags parameter of the track header box are proposed. For example, the mp4 writer uses three new flags values in the track header, each corresponding to the flags available in the mcts_context_info SEI message; i.e. the signification of each new track header flags value corresponds to the semantics of the corresponding flag in the mcts_context_info SEI message. An alternative embodiment, more compact and easier to interpret for mp4 parsers and media players, uses only one new flags value. This new flag value corresponds to the synthesis of the information of the set of flags of the mcts_context_info SEI message or corresponds to the information of the TCDLevels into one indication of changeable decoding context or not for the encapsulated tile set. For example, a TCDLevel equal to 0 or the three flags of mcts_context_info SEI message all set to 0 or any signaling associating to the motion constrained tile set that indicates that the tile set is independently decodable in any position in the picture with any neighbor tiles (from the same video or from another video sequence, like the tile sets of FIG. 7b for example). The new value for the flags parameter is then defined as follows (the name here is just an example):

Track composable: Indicates that the track can be composed or reused with other tracks. Flag value is 0x000016. Note that this implies that when reusing this track, not only the track data but also the dependent track data should be considered for reuse with other tracks. We introduced this track property considering tile set composition, but this track property can be used as well for other video track combinations. When the track is fragmented, the same flag can be used in the track fragment header. From one fragment to another, if the encoding constraints change along the time, the value of the flag can reflect these changes. For example a tile set can have the "track_composable" flags value set to 1 for a temporal fragment and at some point can become no more composable ("track_composable" flags value set to 0) for another temporal fragment.

When, at step 504, a mp4 writer encapsulates the video stream having motion constrained tile sets as a single track, the mapping between the NAL units of the video bitstream and the trif are described in a NALU Mapping sample group 'nalm'. It is not possible here to use the track header compact signaling unless all the the tile sets have the same TCD Levels values or have the same set of flags values. When the tile sets in this single track have different TCDLevels or different context information flags values, then these information have to be provided for each tile set encapsulated in the video track. This invention provides different alternative embodiments to embed this information at System level. First, considering FIG. 9a, the 'trif' VisualSampleGroupEntry is extended with a new parameter called "codingDependencyLevel" (name is here for example). This parameter conveys the TCDLevel value, when a motion constrained tile set is associated to a TCDLevel values (like the different methods explained before FIG. 8 or alternatives). : put for examin the mcts=>track header as well, otherwise trif or derivation of trif.

To avoid modifications of trif, the context information can be conveyed in dedicated VisualSampleGroupEntry, for example: RegionContextInfoGroupEntry ('rcif') defined as follows:

```
class        RegionContextInfoGroupEntry( )          extends
VisualSampleGroupEntry('rcif'){
    unsigned int(16) groupID;
    unsigned int (1) mcts_motion_vectors_over_pic_boundaries;
    unsigned int (1) mcts_exclude_loop_filter_margin;
    unsigned int (1) mcts_temporal_motion_vector_predictor_flag;
    unsigned int (5) reserved ;
}
```

With the following semantics:

groupID gives the groupID of a tile region (as defined by a TileRegionGroupEntry and called referenced tile region) for which region context information is provided.

mcts_motion_vectors_over_pic_boundaries: when set to 0 indicates that the referenced tile region has no constraint regarding picture boundaries; i.e. can be decoded at another position, even not close to its original picture boundary. Otherwise, when set to 1, the referenced tile region is constrained by the picture boundary, i.e. cannot be reused at a different location without risking decoding artifacts.

mcts_exclude_loop_filter_margin: when set to 1 indicates that the referenced tile region is not constrained by loop filters. When set to 0, the referenced tile region cannot be combined with different tiles than its original neighbor tile regions.

mcts_temporal_motion_vector_predictor_flag: when equal to 0 indicates that the referenced tile region has no constraints on motion vector motion predictors from neighbor tile regions. As such, it can be playable in another context. When set to 1, the referenced tile region is constrained by motion vector predictors and should be decoded alone or with in its original context (same position and same neighbor tile regions).

The original context at file format level is given by the 'tbas' relation between the tile tracks and their tile base track. Original neighbor tile regions are the tile regions pointing to the same tile base track as the referenced tile region in the RegionContextInfoGroupEntry. As for the track header embodiment, the RegionContextInfoGroupEntry set of parameters can be reduced to provide more synthetic information. For example, one or or a subset of the suggested parameters can be provided; these three parameters can also be replaced by a TCDLevel value or by a single value compute for each tile set the same way as the "track_composable" value.

An alternative embodiment can be to modify the existing 'trif' using the 2 available reserved bits (as shown on FIGS. 9a and 9b). For example, the first reserved bit can convey the mcts_temporal_motion_vector_predictor_flag with a semantics as given above and the second reserved bit can convey the mcts_motion_vectors_over_pic_boundaries with the same semantics as described above. An alternative can be to re-use the 4 predefined TCD levels as explained above and convey one value among these 4 pre-defined ones. Another alternative is to signal properties for the tile region, each on one of the reserved bits: "movable" and "composable", or even summarized as one flag (as shown on FIG. 9b), for example "composable" (name is here just as an example. When set to 1, the "composable" flag indicates that the tile region has no position constraints (for example regarding picture boundaries) and no constraints on neighboring tiles (for example: can be combined with tiles from other video sequences).

Another embodiment consists in using some of the reserved bits on FIG. 9a to add more values in the independent_idc parameter. For example, values 1 and 2 clearly indicates no dependencies to other tiles. As such, a player parsing the trif box can assume that the tile region can be decoded in any location with any other tile regions. When independent_idc=0, in current trif it indicates that the tile has coding dependencies to other tile regions. The current independent_idc is then missing the cases where a tile region has no decoding dependencies to other tile regions but has encoding constraints (as explained in the mcts context info SEI message). An extended independent_idc has then more bits to also indicate the encoding constraints, for example the tile region constraints with respect to the picture boundaries (the mcts_motion_vectors_over_pic_boundaries flag) and the tile regions constraints regarding the mcts_temporal_motion_vector_predictor_flag.

In alternative embodiment, when independent_idc=0, an additional parameter indicates if the tile can be decoded at different location (as on FIG. 15). This additional parameter is called for example "decodable_elsewhere" to indicate that a tile set can be decoded in another neighborhood. This additional parameter is present only when has_dependency_flag is true and dependency_tile_count equal to 0, as illustrated in FIG. 15.

When mcts_temporal_motion_vector_predictor[i] is equal to 1, tile set extraction process shall not use a tile setup for which the tile set with mcts_id equal to mcts_context_id [i] is decoded with other tile set different from the tile set at encoding.

The use of modified or extended trif can apply as well when each tile set is encapsulated in its own tile track as an alternative to the track header flag or to provide more detailed information on tile set encoding constraints and reuse possibilities when the track header flags value is a single value like the "track_composable" flags value.

At the end, the encapsulation step 505 consists for an mp4 writer in parsing the mcts context information from one of the tile-set related SEI messages (in a preferred embodiment; the mcts_context_info_SEI message). Then, the mp4 writer maps the information (for example the flags values) to either a track flags value or in the extended 'trif' or in a new VisualSampleGroupEntry like 'rcif'. The mp4 writer can decide to also encapsulate the tile set related SEI messages in their corresponding tile track: for a given mcts_id, the mp4writer inserts the NAL units corresponding to the tile set related SEI message in the tile track that encapsulates the data of tile set of the given mcts_id value. When the mp4 parser encapsulates the tile sets in a single video track, the NAL units for the tile set related SEI messages can also be encapsulated with video data. However, in a preferred embodiment, once the mp4 writer has mapped the tile set related SEI messages according to this invention it does not insert NAL units corresponding to tile set related SEI messages for compacity.

In another embodiment, or if the video is encapsulated for streaming, the tile set decoding dependency information is specified at MPD level in step 508 of FIG. 5. This information is specified in any XML element of the MPD for instance as a new node (new element or new attribute). It can also be defined in new specific descriptor through a SupplementalProperty or EssentialProperty descriptor with a specific scheme_id_uri value (for example: "urn:mpeg:dash:2017:tcdl" or any reserved URN for that purpose). The value attribute of the descriptor is then an integer value representing the tile set decoding dependency information. In another embodiment, the value attribute contains a list of flags associated with their value. Typically, the flags defined in the SEI message of FIG. 14 are listed.

According to a preferred embodiment, we extend the DASH SRD descriptor as proposed in the FIG. 10. The SRD scheme allows Media Presentation Description authors to express spatial relationships between Spatial Objects. In such a case, the last value of the SRD's value attribute is an optional parameter, for example called tile coding dependency level. When not present, the TCD level is inferred to be equal to a predetermined value for instance 0. Otherwise, the value corresponds to the tile set coding dependency and makes it possible for the client to select the representation in function of the usage scenario:

When the field is equal to 0, it indicates that the Spatial Object can be combined with other Spatial Objects even with different source_id and its decoded location can be changed (with a transcoding step of the slice header on client side), When the field is equal to 1, it indicates that the Spatial Object can be combined with other tile region(s) with different source_id while preserving its original location/position, When the field is equal to 2, it indicates that the Spatial Object can be combined only with tile region (s) with the same source_id and while preserving the same neighbor tile region(s)

FIG. 11 illustrates the introduction of a control code at the tile set level in an embodiment of the invention.

In an embodiment, the encoder further generates during step 502 additional SEI messages to help the decoder to determine whether the decoded samples corresponding to a decoded tile set are correct or not. The principle is to extend the existing HEVC "Decoded picture hash" SEI message which indicates a picture hash per YUV component. A hash value is the result of a hash function applied on the values of the frame YUV components. Several hash functions exists and are well known. For the existing HEVC "Decoded picture hash", only MD5, checksum and CRC functions may be used.

On FIG. 11, a new_decode_picture hash SEI message is proposed. It contains a set of HASH values associated to a tile set. Since the hash functions may be computed for one or more tile sets and not necessarily for the whole tile sets, a first parameter of the SEI message (tile_hash_count) defines the number of tile sets for which a hash. For each tile in the tile set, the position of each tile in the tile sets is specified by top_left_tile_index and bottom_right_tile_index field. It is also associated to a hash_type field which specifies the type of the hash function in use among MD5, CRC and checksum hash. This list is non exhaustive, other else if statements could be added to handle different hash functions. The hash of the tile set is specified in tileset_md5 or tileset_crc or tileset_checksum fields. When decoding one tile set, the decoder is able to compute the hash of the tile set and to compare this computed value with the one in the new "tileset_decoded_picture_hash" SEI message. When the hash values are the same, it means that the tile set is correctly decoded.

When the decoder combines several tile sets from different video streams, the "tileset_decoded_picture_hash" SEI messages are merged. The client extracts the tile set's hash values of the tile set of the second stream. The clients then replaces the tile set hash values in the SEI message of the first stream corresponding to the tile sets of the 2nd bitstream with the extracted hash values.

In another embodiment, instead of specifying the locations of the tile sets in the tileset_decode_picture_hash SEI message, the encoder refers to an existing tile set specified in a temporal motion-constrained tile set received previously. The table of FIG. 18 is an example of SEI message. The decoded motion-constrained tile set (MCTS) hash SEI message includes a set of syntax fields that share a similar semantic with tileset_decoded_picture_hash SEI message. Other syntax elements makes it possible to specify a hash value for rectangular region in the tile sets and also for cropped area in this region. The encoder may use this cropped region to specify a hash values for tile sets while excluding a band of 4 pixels inside the tile set boundaries when loop filter are applied on the tile set boundaries.

The semantics of the Decoded motion constrained tile set hash SEI message is the following:

num_mcts_hash_minus1 indicates the number of motion-constrained tile set rectangular regions of tiles, minus one, for which a hash is provided.

mcts_hash_id[n] provides a value of an exiting mcts_id, defined in a previous temporal motion-constrained tile set SEI message.

mcts_hash_rect_idx[n] provides the index of an existing definition of a rectangular region of tiles in the motion-constrained tile set identified by mcts_hash_id. This is the rectangular region of tiles on which the hash is computed.

crop_mcts_hash[n] equal to 0 indicates that the hash is computed on the whole rectangular region of tiles. crop_mcts_hash[n] equal to 1 indicate that the hash is computed in a cropped area of the rectangular region of tiles that is defined with the following parameters.

crop_mcts_hash_with_same_margins[n] equal to 1 indicates that the cropped region on which to compute the hash is obtained by ignoring the same number of pixels on the top, left, bottom and right boundaries of the rectangular region of tiles. This number of pixels is provided by crop_mcts_hash margin[n].

crop_mcts_hash_with_same_margins[n] equal to 0 indicate that the margins of pixels to ignore may be different between the top, left, bottom and right boundaries. In such case the number of rows/columns of pixels to ignore are provided by crop_mcts_hash top_margin[n], crop_mcts_hash bottom_margin[n], crop_mcts_hash left_margin[n] and crop_mcts_hash right_margin[n].

crop_mcts_hash_margin[n] provides the number of pixels rows/columns of the top, left, right and bottom of the rectangular region of tiles to ignore, when crop_mcts_hash[n] and crop_mcts_hash_with_same_margins[n] are both equal to 1.

crop_mcts_hash top_margin[n], crop_mcts_hash bottom_margin[n], crop_mcts_hash left_margin[n] and crop_mcts_hash right_margin[n] provide the number of pixel rows/columns of the top, left, right and bottom of the rectangular region of tiles to ignore, when crop_mcts_hash[n] is equal to 1 and crop_mcts_hash_with_same_margins[n] is equal to 0.

crop_mcts_hash_margin[n], crop_mcts_hash top_margin[n], crop_mcts_hash bottom_margin[n], crop_mcts_hash left_margin[n] and crop_mcts_hash right_margin[n] are expressed in number of luma pixels. In order to obtain the number of chroma pixels rows/columns to ignore, these values are divided by SubHeightC for the rows and by SubWidthC for the columns.

Prior to computing the hash, region size and cropping values are initialized as follow:

```
for( n = 0; n <= num_mcts_hash_minus1; n++ ) {
  if ( crop_mcts_hash[ n ] == 0 )
    crop_mcts_hash_margin[ n ] = 0
  if ( crop_mcts_hash[ n ] == 0 || crop_mcts_hash_with_same_margins[ n ] == 1 ) {
    crop_mcts_hash_top_margin[ n ] = crop_mcts_hash_margin[ n ]
    crop_mcts_hash_bottom_margin[ n ] = crop_mcts_hash_margin[ n ]
    crop_mcts_hash_left_margin[ n ] = crop_mcts_hash_margin[ n ]
    crop_mcts_hash_right_margin[ n ] = crop_mcts_hash_margin[ n ]
  }
  top_left_tile_row[ n ] = top_left_tile_index[ n ] / (num_tile_columns_minus1 + 1)
  top_left_tile_column[ n ] = top_left_tile_index[ n ] - top_left_tile_row[ n ] * (num_tile_columns_minus1 + 1)
  bottom_right_tile_row[ n ] = bottom_right_tile_index[ n ] / (num_tile_columns_minus1 + 1)
  bottom_right_tile_column[ n ] =
    bottom_right_tile_index[ n ] - bottom_right_tile_row[ n ] * (num_tile_columns_minus1 + 1)
  mcts_rect_height_in_luma_samples[ n ] = 0
  mcts_rect_width_in_luma_samples[ n ] = 0
  for (i = top_left_tile_row[ n ]; i <= bottom_right_tile_row[ n ]; i++ )
    mcts_rect_height_in_luma_samples[ n ] += RowHeightInLumaSamples[ i ]
  for (i = top_left_tile_column[ n ]; i <= bottom_right_tile_column[ n ]; i++ )
    mcts_rect_width_in_luma_samples[ n ] += ColumnWidthInLumaSamples[ i ]
}
```

Where top_left_tile_index[n] and bottom_right_tile_index[n] correspond to the values top_left_tile_index[i][mcts_hash_rect_idx[n]] and top_right_tile_index[i][mcts_hash_rect_idx[n]] as defined in the temporal motion constrained tile SEI message that has its mcts_id[i] equal to mcts_hash_id[n].

Prior to computing the hash of the 'n'-th motion-constrained tile set rectangular region of tiles, the decoded picture data of that motion-constrained tile set rectangular region of tiles is arranged into one or three strings of bytes called mctsData[n][cIdx] of lengths dataLen[n][cIdx] as follows:

```
for( n = 0; n <= num_mcts_hash_minus1; n++ )
  for( cIdx = 0; cIdx < ( chroma_format_idc = = 0 ) ? 1 : 3; cIdx++ ) {
    if( cIdx = = 0 ) {
      compWidth[ n ][ cIdx ] = mcts_rect_width_in_luma_samples[ n ]
      compHeight[ n ][ cIdx ] = mcts_rect_height_in_luma_samples[ n ]
      compDepth[ cIdx ] = BitDepthY
      cropTop[ n ][ cIdx ] = crop_mcts_hash_top_margin[ n ]
      cropBottom[ n ][ cIdx ] = crop_mcts_hash_bottom_margin[ n ]
      cropLeft[ n ][ cIdx ] = crop_mcts_hash_left_margin[ n ]
      cropRight[ n ][ cIdx ] = crop_mcts_hash_right_margin[ n ]
    } else {
      compWidth[ n ][ cIdx ] = mcts_rect_width_in_luma_samples[ n ] / SubWidthC
      compHeight[ n ][ cIdx ] = mcts_rect_height_in_luma_samples[ n ] / SubHeightC
      compDepth[ cIdx ] = BitDepthC        (D XX)
      cropTop[ n ][ cIdx ] = crop_mcts_hash_top_margin[ n ] / SubHeightC
      cropBottom[ n ][ cIdx ] = crop_mcts_hash_bottom_margin[ n ] / SubHeightC
      cropLeft[ n ][ cIdx ] = crop_mcts_hash_left_margin[ n ] / SubWidthC
      cropRight[ n ][ cIdx ] = crop_mcts_hash_right_margin[ n ] / SubWidthC
    }
```

-continued

```
    iLen = 0
    for( i = cropTop[ n ][ cIdx ]; i < compHeight[ n ][ cIdx ] - cropBottom[ n ][ cIdx ]; i++ )
      for( j = cropLeft[ n ][ cIdx ]; j < compWidth[ n ][ cIdx ] - cropRight[ n ][ cIdx ]; j++ ) {
        mctsData[ n ][ cIdx ][ iLen++ ] = mcts_component[ n ][ cIdx ][ i * compWidth[ n ][ cIdx ] + j ] & 0xFF
        if( compDepth[ cIdx ] > 8 )
          mctsData[ n ][ cIdx ][ iLen++ ] = mcts_component[ n ][ cIdx ][ i * compWidth[ n ][ cIdx ] + j ] >> 8
```

```
    }
  dataLen[ n ][ cIdx ] = iLen
}
``` where mcts_component[n][cldx][i] is an array in raster scan of decoded sample values of the motion-constrained tile set rectangular region of tiles in two's complement representation.

mcts_hash_type[n] indicates the method used to calculate the checksum. For instance, MD5, checksum or CRC hash functions may be used.

mcts_md5[n][cldx][i] is the 16-byte MD5 hash of the cldx-th colour component of the decoded motion-constrained tile.

mcts_crc[n][cldx] is the cyclic redundancy check (CRC) of the colour component cldx of the decoded motion-constrained tile.

mcts_checksum[n][cldx] is the checksum of the colour component cldx of the decoded motion constrained tile.

In another embodiment, the encoder creates one SEI message for each tile set. Each tileset_decoded_picture_hash SEI message then indicates the hash values of a single tile set. The advantage is that tile sets hashes can be easily included in the combined stream when combining tiles of different streams without SEI messages re-writing steps.

In one embodiment, the temporal motion-constrained tile set includes digest information for each tile set as represented in the FIG. 19. The tile_set_digest_flag equal to 1 indicates that digest information is present for the i-th tile set. In such case, a set of field specifies the hash values of the tile sets with similar semantics as for mcts_tile_set_digest SEI message.

In a second embodiment, temporal motion constrained tile set includes digest information only for motion constrained tile set for which mc_exact_sample_value_match_flag[i] is equal to 1. The advantage is that tile set hash digest information is specified only when the tile set is independently decodable.

When the video bitstream contains SEI message with tile set based checksum, it can be useful to provide this information at System level for media players and/or media clients that want to check correct decoding of a tile set or a tile region. To do so, during encapsulation step 504, an mp4 writer, when encapsulating the video bitstream as a set of tile tracks plus tile base track place the NAL units providing checksum information for a tile set in the tile track encapsulating this tile set. This is done by simply appending the SEI NAL units of the checksum information as NAL units of the tile track. Thus, when retrieving the tile track, the media player or media client will also retrieve the tile set related checksum. When the mp4 parser encapsulates the tile sets as one single video bitstream with a description of the NAL unit mapping ('nalm') to the tile regions ('trif'), it takes care of assigning 'trif' identifiers (groupID) that correspond to the mcts_id, so that the mapping between checksum data and tile data is easier.

In one embodiment, the SEI message of FIG. 13 is modified to indicate the hash values as illustrated in FIG. 16.

Figure 12:
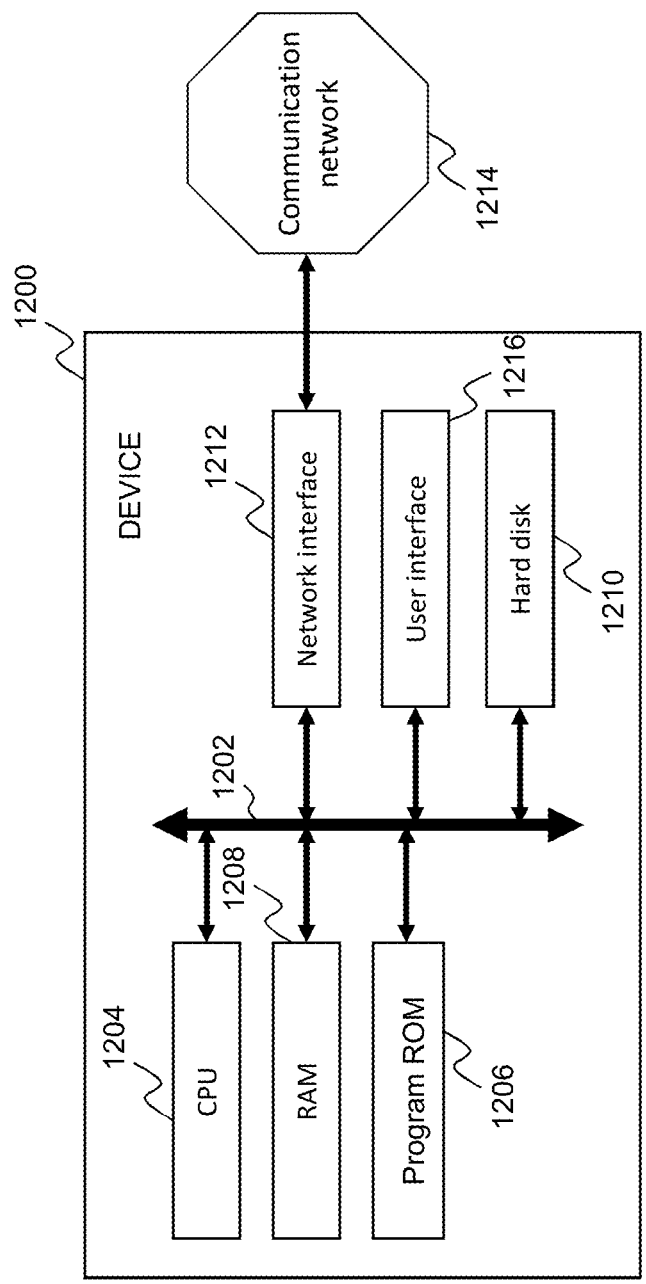
FIG. 12 represents a block diagram of a server or a client device 1200 in which steps of one or more embodiments may be implemented.

FIG. 12 represents a block diagram of a server or a client device 1200 in which steps of one or more embodiments may be implemented.

Preferably, the device 1200 comprises a communication bus 1202, a central processing unit (CPU) 1204 capable of executing instructions from program ROM 1206 on powering up of the device, and instructions relating to a software application from main memory 1208 after the powering up. The main memory 1208 is for example of Random Access Memory (RAM) type which functions as a working area of CPU 1204 via the communication bus 1202, and the memory capacity thereof can be expanded by an optional RAM connected to an expansion port (not illustrated). Instructions relating to the software application may be loaded to the main memory 1208 from a hard disk (HD) 1210 or the program ROM 1206 for example. Such software application, when executed by the CPU 1204, causes the encoding step described with reference to FIG. 5 to be performed in the server.

Reference numeral 1212 is a network interface that allows the connection of the device 1200 to the communication network 1214. The software application when executed by the CPU 1204 is adapted to react to requests received through the network interface and to provide data streams and requests via the network to other devices.

Reference numeral 1216 represents user interfaces to display information to, and/or receive inputs from, a user.

It should be pointed out here that, as a variant, the device 1200 for managing the reception or sending of multimedia bit-streams can consist of one or more dedicated integrated circuits (ASIC) that are capable of implementing the method as described with reference to FIG. 6. These integrated circuits are for example and non-restrictively, integrated into an apparatus for generating or displaying video sequences and/or for listening to audio sequences.

Embodiments of the invention may be embedded in a device such as a camera, a smartphone, or a tablet that acts as a remote controller for a TV, for example to browse a mosaic of videos and/or zoom into a particular region of interest. They can also be used from the same devices to have personalized browsing experience of a TV program by selecting specific areas of interest. Another usage of these devices by a user is to share selected sub-parts of his/her preferred videos with other connected devices. They can also be used in smartphone or tablet to monitor what happens in a specific area of a building placed under surveillance provided that the surveillance camera supports the generation part of this invention.

Any step of the algorithm shown in FIGS. 5 and 6 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for encoding data corresponding to at least one spatial part of a video sequence in a bitstream, each of a plurality of frames of the video sequence being divided into spatial parts, the method comprising:
determining additional data, for signalling in the bitstream at least one encoding constraint associated with the at least one spatial part of the video sequence;
encoding the at least one spatial part of the video sequence according to the at least one encoding constraint along with the determined additional data in the bitstream,
wherein the encoding constraint indicates a set of coding dependency constraints,
applying a hash function to one or more spatial parts; and,
signalling the result of the hash function for the one or more spatial parts in the bitstream.

2. The method of claim 1, wherein the result of the hash function is associated with an identifier of a spatial part.

3. The method of claim 1, wherein the result of the hash function is included in an additional message containing supplemental enhancement information.

4. The method of claim 3, wherein the additional message comprises data for indicating a number of spatial parts to which the additional message applies.

5. The method of claim 3, wherein a separate additional message is created for each of the one or more spatial parts.

6. The method of claim 3, wherein the additional message comprises data for indicating for which spatial part or parts a hash result is provided.

7. The method of claim 3, wherein the additional message comprises a hash result for independently decodable spatial part or parts only.

8. The method of claim 1, further signalling a type of the hash function in the bitstream.

9. The method of claim 1, wherein one encoding constraint is related to the possibility to combine spatial parts from one or more video sequences.

10. The method of claim 1, wherein the encoding constraint or constraints for the spatial part are at least one of:
a dependency introduced by the selection of a predictor block outside spatial part boundaries in temporal prediction encoding modes,
a dependency introduced by the selection of a predictor block outside frame boundaries for temporal motion prediction through frame border extension mechanism,
a dependency introduced by sub-pixel interpolation filter,
a dependency introduced by deblocking filter and SAO filter,
a dependency introduced by motion vector prediction mechanism.

11. A non-transitory computer-readable storage medium storing instructions of a computer program for implementing the method according to claim 1.

12. A method for decoding data corresponding to a bitstream representing a video sequence, each of a plurality of frames of the video sequence being divided into spatial parts, the method comprising:
obtaining video data corresponding to at least one spatial part of the video sequence;
wherein the method further comprises
obtaining additional data, signalling at least one encoding constraint associated with the obtained spatial part of the video sequence;
wherein the encoding constraint indicates a set of coding dependency constraints;
decoding the obtained video data according to the at least one encoding constraint to obtain a decoded spatial part;
retrieving from the bitstream a result of a hash function for one or more spatial parts;
computing a hash value of the decoded spatial part using the hash function and comparing the computed hash value with the corresponding retrieved hash result to infer whether the spatial part is correctly decoded.

13. A non-transitory computer-readable storage medium storing instructions of a computer program for implementing the method according to claim 11.

14. The method of claim 12, wherein the retrieved hash result of the hash function is associated with an identifier of a spatial part.

15. The method of claim 12, wherein the retrieved hash result of the hash function is included in an additional message containing supplemental enhancement information.

16. The method of claim 15, wherein the additional message comprises data for indicating a number of spatial parts to which the additional message applies.

17. The method of claim 15, wherein a separate additional message is obtained for each of the one or more spatial parts.

18. The method of claim 15, wherein the additional message comprises data for indicating for which spatial part or parts a retrieved hash result is provided.

19. The method of claim 15, wherein the additional message comprises a retrieved hash result for independently decodable spatial part or parts only.

20. The method of claim 12, further obtaining a type of the hash function in the bitstream.

21. The method of claim 12, wherein one encoding constraint is related to the possibility to combine spatial parts from one or more video sequences.

22. The method of claim 12, wherein the encoding constraint or constraints for the spatial part are at least one of:
a dependency introduced by the selection of a predictor block outside spatial part boundaries in temporal prediction encoding modes,
a dependency introduced by the selection of a predictor block outside frame boundaries for temporal motion prediction through frame border extension mechanism,
a dependency introduced by sub-pixel interpolation filter,
a dependency introduced by deblocking filter and SAO filter,
a dependency introduced by motion vector prediction mechanism.

23. A device for encoding data corresponding to at least one spatial part of a video sequence in a bitstream, each of a plurality of frames of the video sequence being divided into spatial parts, the device comprising:
an encoding constraint signalling block determining additional data, for signalling in the bitstream at least one encoding constraint associated with the at least one spatial part of the video sequence;
an encoder encoding the at least one spatial part of the video sequence according to the at least one encoding constraint along with the determined additional data in the bitstream,
wherein the encoding constraint indicates a set of coding dependency constraints,
a selection block for selecting one or more spatial parts;
a hash block applying a hash function to selected spatial parts; and, a hash signalling block signalling the result of the hash function for the selected spatial parts of the video sequence.

24. A device for decoding data corresponding to a bitstream representing a video sequence, each of a plurality of frames of the video sequence being divided into spatial parts, the device comprising:
- a video data receiver obtaining video data corresponding to at least one spatial part of the video sequence;
- wherein the device further comprises
- an additional data receiver obtaining additional data signalling at least one encoding constraint associated with the obtained spatial part of the video sequence; wherein the encoding constraint indicates a set of coding dependency constraints;
- a decoder decoding the obtained video data according to the at least one encoding constraint to obtain a decoded spatial part;
- a hash block retrieving from the bitstream a result of a hash function for one or more spatial parts;
- a hash checking block computing a hash value of the decoded spatial part using the hash function and comparing the computed hash value with the corresponding retrieved hash result to infer whether the spatial part is correctly decoded.

* * * * *